United States Patent
Yamamoto et al.

(10) Patent No.: US 11,005,522 B2
(45) Date of Patent: *May 11, 2021

(54) TERMINAL AND TRANSMISSION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Ayako Horiuchi, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/748,408

(22) Filed: Jan. 21, 2020

(65) Prior Publication Data
US 2020/0162124 A1    May 21, 2020

Related U.S. Application Data

(63) Continuation of application No. 15/772,505, filed as application No. PCT/JP2016/004683 on Oct. 25, 2016, now Pat. No. 10,581,483.

(30) Foreign Application Priority Data

Nov. 6, 2015 (JP) ................................ 2015-218442

(51) Int. Cl.
*H04B 1/713* (2011.01)
*H04J 13/18* (2011.01)
(Continued)

(52) U.S. Cl.
CPC .............. *H04B 1/713* (2013.01); *H04J 13/18* (2013.01); *H04L 27/26* (2013.01); *H04W 28/04* (2013.01); *H04W 72/04* (2013.01)

(58) Field of Classification Search
None
See application file for complete search history.

(56) References Cited

U.S. PATENT DOCUMENTS 8,913,593 B2   12/2014  Dinan
2013/0322363 A1*  12/2013  Chen ..................... H04L 5/001
                                                   370/329

(Continued)

FOREIGN PATENT DOCUMENTS

JP   2014-511057 A   5/2014
WO   2015/030523 A1  3/2015

OTHER PUBLICATIONS

3GPP TS 36.211 V12.7.0, "3rd Generation Partnership Project; Technical Specification Group Radio Access Network; Evolved Universal Terrestrial Radio Access (E-UTRA); Physical channels and modulation (Release 12)," Sep. 2015, 136 pages.

(Continued)

*Primary Examiner* — Adolf Dsouza
(74) *Attorney, Agent, or Firm* — Seed IP Law Group LLP

(57) ABSTRACT

In the present invention, regarding a narrowband used in a subframe for transmitting uplink data, if a switch is made from a first narrowband used in a first subframe to a second narrowband that is different from the first narrowband, with respect to a second subframe continuing to the first subframe, a final one symbol of the first subframe and an initial one symbol of the second subframe are punctured and set as a retuning time to transmit the uplink data in the first narrowband and the second narrowband.

6 Claims, 20 Drawing Sheets

(51) Int. Cl.
  *H04L 27/26* (2006.01)
  *H04W 28/04* (2009.01)
  *H04W 72/04* (2009.01)

(56) References Cited

U.S. PATENT DOCUMENTS

| | | | |
|---|---|---|---|
| 2014/0071864 A1 | 3/2014 | Seo et al. | |
| 2016/0337157 A1* | 11/2016 | Papasakellariou | H04B 3/232 |
| 2018/0069612 A1* | 3/2018 | Yum | H04L 1/00 |
| 2018/0262295 A1 | 9/2018 | Oketani | |
| 2018/0367185 A1* | 12/2018 | Yi | H04B 1/7143 |

OTHER PUBLICATIONS

ETSI TS 136 212 V12.6.0, "Evolved Universal Terrestrial Radio Access (E-UTRA); Multiplexing and channel coding (3GPP TS 36.212 V12.6.0, Release 12)" Oct. 2015, 96 pages.

ETSI TS 136 213 V12.7.0, "Evolved Universal Terrestrial Radio Access (E-UTRA); Physical layer procedures (3GPP TS 36.213 V12.7.0, Release 12)," Oct. 2015, 243 pages.

Ericsson, Nokia Networks, "New WI proposal: Further LTE Physical Layer Enhancements for MTC," RP-141660, 3GPP TSG RAN Meeting #65, Agenda Item: 14.1.1, Edinburgh, Scotland, Sep. 9-12, 2014, 9 pages.

International Search Report, dated Dec. 20, 2016, for the related International Patent Application No. PCT/JP2016/004683, 2 pages.

MCC Support, "Final Report of 3GPP TSG RAN WG1 #80 v1.0.0 (Athens, Greece, Feb. 9-13, 2015)," R1-151454, Belgrade, Serbia, Apr. 20-24, 2015, 91 pages.

Nakao et al., "Performance enhancement of E-UTRA uplink control channel in fast fading environments," Proceeding of 2009 IEEE 69$^{th}$ Vehicular Technology Conference (VTC2009-Spring), Apr. 2009, 5 pages.

Nokia Networks, "Retuning Gaps for MTC," R1-155132, 3GPP TSG-RAN WG1 Meeting #82bis, Agenda item: 7.2.1.1, Malmö, Sweden, Oct. 5-9, 2015, 6 pages.

RAN4, "Reply LS on returning time between narrowband regions for MTC," R1-155051, 3GPP TSG RAN WG1 Meeting #82bis, Malmö, Sweden, Oct. 5-9, 2015, 1 page.

Indian Office Action, dated Mar. 23, 2021, for Indian Application No. 201827016210, 6 pages.

* cited by examiner

TERMINAL AND TRANSMISSION METHOD

TECHNICAL FIELD

The present disclosure relates to a terminal and a transmission method.

BACKGROUND ART

In 3GPP LTE (3rd Generation Partnership Project Long Term Evolution), OFDMA (Orthogonal Frequency Division Multiple Access) is adopted as a communication scheme for a downlink from a base station (also referred to as an eNB) to a terminal (also referred to as a UE (User Equipment)) is adopted, and SC-FDMA (Single Carrier-Frequency Division Multiple Access) is adopted as a communication scheme for an uplink from a terminal to a base station (see, for example, NPLs 1 to 3).

In LTE, a base station performs communication by assigning an RB (Resource Block) in a system band to a terminal on a time unit basis, the time unit being called a subframe. FIG. 1 shows a configuration example of a subframe of an LTE uplink shared channel (PUSCH: Physical Uplink Shared Channel). As shown in FIG. 1, one subframe is made up of two time slots. In each slot, a plurality of SC-FDMA data symbols and DMRS's (Demodulation Reference Signals) are time-multiplexed. Upon receipt of a PUSCH, the base station performs channel estimation using the DMRS's. After that, the base station performs demodulation/decoding of the SC-FDMA data symbols using a result of the channel estimation.

Further, in LTE, HARQ (Hybrid Automatic Repeat Request) is applied to downlink data. In other words, a terminal feeds back a response signal indicating an error detection result of downlink data to a base station. The terminal performs CRC (Cyclic Redundancy Check) for the downlink data, and feeds back an acknowledgement (ACK) if there is not an error in an operation result of the CRC and a negative acknowledgement (NACK) if there is an error in the operation result of the CRC, to the base station as the response signal. An uplink control channel such as a PUCCH (Physical Uplink Control Channel) is used to feed back this response signal (that is, the ACK/NACK signal).

A plurality of formats are selectively used according to situations of the terminal transmitting the ACK/NACK signal through the PUCCH. For example, if there is not control information to be transmitted other than the ACK/NACK signal and an uplink scheduling request, a PUCCH format 1a/1b is used. On the other hand, if transmission of the ACK/NACK signal overlaps with feedback of CSI (Channel State Information) which is periodically transmitted through an uplink channel, a PUCCH format 2a/2b is used.

As shown in FIG. 2, each of a plurality of ACK/NACK signals transmitted from a plurality of terminals in the PUCCH format 1a/1b is spread by a ZAC (Zero Auto-Correlation) sequence having a Zero Auto-correlation characteristic (multiplied by the ZAC sequence) on a time axis and is code-multiplexed in the PUCCH. In FIG. 2, (W(0), W(1), W(2), W(3)) indicates a Walsh sequence with a sequence length of 4, and (F(0), F(1), F(2)) indicates a DFT (Discrete Fourier Transform) sequence with a sequence length of 3.

As shown in FIG. 2, first in a terminal, the ACK/NACK signal is primarily spread to frequency components each of which corresponds to one SC-FDMA symbol by the ZAC sequence (with a sequence length of 12) on a frequency axis. In other words, the ZAC sequence with a sequence length of 12 is multiplied by ACK/NACK signal components each of which is represented by a complex number. Next, each of the primarily spread ACK/NACK signal and the ZAC sequence as a reference signal are secondarily spread by the Walsh sequence (with a sequence length of 4; W(0) to W(3)) and the DFT sequence (with a sequence length of 3; F(0) to F(2)), respectively. In other words, components of the signal with a sequence length of 12 (the primarily spread ACK/NACK signal or the ZAC sequence as a reference signal) are multiplied by components of an orthogonal cover code (OCC) sequence (the Walsh sequence or the DFT sequence), respectively. Furthermore, the secondarily spread signals are converted to signals with a sequence length of 12 on the time axis by IDFT (Inverse Discrete Fourier Transform) or IFFT (Inverse Fast Fourier Transform). Then, a CP (Cyclic Prefix) is added to each of the signals after the IFFT, and a 1-slot signal composed of seven SC-FDMA symbols is formed.

Further, as shown in FIG. 3, a PUCCH is assigned to each terminal in subframes.

ACK/NACK signals from different terminals are spread (multiplexed) with ZAC sequences defined by different cyclic shift indexes or orthogonal cover code sequences corresponding to different sequence numbers (orthogonal cover (OC) indexes). An orthogonal cover code sequence is a set of a Walsh sequence and a DFT sequence. Further, the orthogonal cover code sequence may be referred to as a block-wise spreading code sequence. Therefore, a base station can separate the plurality of code-multiplexed ACK/NACK signals by using conventional despreading and correlation processing (see, for example, NPL 4).

By the way, recently, M2M (Machine-to-Machine) communication is promising which realizes services by autonomous communication among pieces of equipment without judgment of users as a structure supporting a future information society. A specific application example of an M2M system includes a smart grid. The smart grid is an infrastructure system for efficiently supplying lifelines such as electricity and gas. For example, the smart grid performs M2M communication between a smartmeter disposed in each home or building and a central server to autonomously and efficiently adjust demand balance of resources. Other application examples of the M2M communication system include a monitoring system for article management, environmental sensing or telemedicine, remote management of stock or charging for vending machines, and the like.

As for the M2M communication system, attention has been paid especially to utilization of a cellular system having an extensive communication area. In 3GPP, standardization of enhancement of a cellular network for M2M called MTC (Machine Type Communication) has been promoted (see, for example, NPL 5) in standardization of LTE and LTE-Advanced, and examination of specifications has been started, with cost reduction, power consumption reduction and coverage enhancement as requirements. Especially, in the case of terminals, such as smartmeters, which are virtually immobile unlike handset terminals which are often used by users while the users are moving, it is necessary to secure coverage to provide services. Therefore, in order to support a case where, at a place in an existing LTE and LTE-Advanced communication area where an LTE or LTE-Advanced terminal cannot be used, such as the underground of a building, a terminal (an MTC terminal) usable at such a place is disposed, "coverage enhancement (MTC coverage enhancement)" to further expand a communication area has been examined.

CITATION LIST

Non-Patent Literature

NPL 1
3GPP TS 36.211 V12.7.0, "Evolved Universal Terrestrial Radio Access (E-UTRA); Physical channels and modulation (Release 12)," September 2015
NPL 2
3GPP TS 36.212 V12.6.0, "Evolved Universal Terrestrial Radio Access (E-UTRA); Multiplexing and channel coding (Release 12)," September 2015
NPL 3
3GPP TS 36.213 V12.7.0, "Evolved Universal Terrestrial Radio Access (E-UTRA); Physical layer procedures (Release 12)," September 2015
NPL 4
Seigo Nakao, Tomofumi Takata, Daichi Imamura, and Katsuhiko Hiramatsu, "Performance enhancement of E-UTRA uplink control channel in fast fading environments," Proceeding of 2009 IEEE 69th Vehicular Technology Conference (VTC2009-Spring), April 2009
NPL 5
RP-141660, Ericsson, Nokia Networks, "New WI proposal: Further LTE Physical Layer Enhancements for MTC," September 2014
NPL 6
R1-151454, MCC Support, "Final Report of 3GPP TSG RAN WG1#80 v1.0.0," February 2015
NPL 7
R1-155051, RAN4, Ericsson, "Reply LS on retuning time between narrowband regions for MTC," August 2015

SUMMARY OF INVENTION

In MTC coverage extension, "repetition" technology of repeatedly transmitting the same signal a plurality of times is examined in order to further expand a communication area. In the repetition, by combining signals which have been repetition-transmitted on the transmission side, received signal power is improved, and coverage (a communication area) is expanded.

In MTC for which examination of specifications of LTE-Advanced Release 13 (Rel-13) is promoted, a terminal (hereinafter also referred to as an MTC terminal) supports only a frequency bandwidth of 1.4 MHz (also referred to as a narrowband or a narrowband region) in order to realize reduction in cost of the terminal. Therefore, "frequency hopping" is introduced in which the 1.4-MHz frequency band to be used by the terminal for transmission is hopped for every predetermined number of subframes within a system band (see, for example, NPL 6). At the time of frequency hopping, carrier frequency retuning time is required. It is thought that time corresponding to up to about two symbols is required as the retuning time (see, for example, NPL 7).

In a downlink, since a Rel-13 MTC terminal does not receive an existing LTE downlink control channel (PDCCH: Physical Downlink Control Channel), the first two OFDM symbols of a subframe which is an existing LTE PDCCH region can be used for the retuning time.

On the other hand, in an uplink, the Rel-13 MTC terminal can transmit a PUSCH or a PUCCH using all SC-FDMA symbols in a subframe, similarly to an existing LTE terminal. Therefore, in order to apply frequency hopping to the MTC terminal, it is necessary to, at the time of retuning, stop transmission of a part of the PUSCH or the PUCCH to secure retuning time corresponding to about two SC-FDMA symbols. It is necessary to suppress deterioration of transmission characteristics while securing the retuning time for an uplink signal (PUSCH or PUCCH).

A terminal according to an aspect of the present disclosure adopts a configuration provided with: a control section that, if, for a narrowband to be used for a subframe to transmit uplink data, switching from a first narrowband used for a first subframe to a second narrowband different from the first narrowband, for a second subframe following the first subframe, punctures a last one symbol of the first subframe and a first one symbol of the second subframe to set the symbols as retuning time; and a transmitting section that transmits the uplink data in the first narrowband and the second narrowband.

Comprehensive or specific aspects of the above may be realized by a system, a method, an integrated circuit, a computer program or a recording medium or may be realized by an arbitrary combination of a system, an apparatus, a method, an integrated circuit, a computer program and a recording medium.

According to one aspect of the present disclosure, it is possible to secure retuning time while suppressing deterioration of transmission characteristics of an uplink signal (PUSCH or PUCCH).

Further advantages and effects of the one aspect of the present disclosure will be made clear from the specification and accompanying drawings. Such advantages and/or effects are provided by some embodiments and features shown in the specification and the accompanying drawings. It is not necessarily required that all of them are provided to obtain one or more same features.

DESCRIPTION OF EMBODIMENTS

Embodiments of the present disclosure will be described in detail with reference to accompanying drawings.

[One Piece of Knowledge which Became Basis of Present Disclosure]

As described above, in a downlink, since a Rel-13 MTC terminal does not receive an existing LTE down link control channel (PDCCH: Physical Downlink Control Channel), the first two OFDM symbols of a subframe which is an existing LTE PDCCH region can be used as the retuning time.

On the other hand, in an uplink, the Rel-13 MTC terminal can transmit a PUSCH or a PUCCH using all SC-FDMA symbols in a subframe, similarly to an existing LTE terminal. Therefore, in order to apply frequency hopping to the MTC terminal, it is necessary to, at the time of retuning, stop transmission of a part of the PUSCH or the PUCCH to secure retuning time corresponding to about two SC-FDMA symbols.

As a method for securing retuning time for an uplink, four Methods 1 to 4 shown below will be described.

Figure 4:
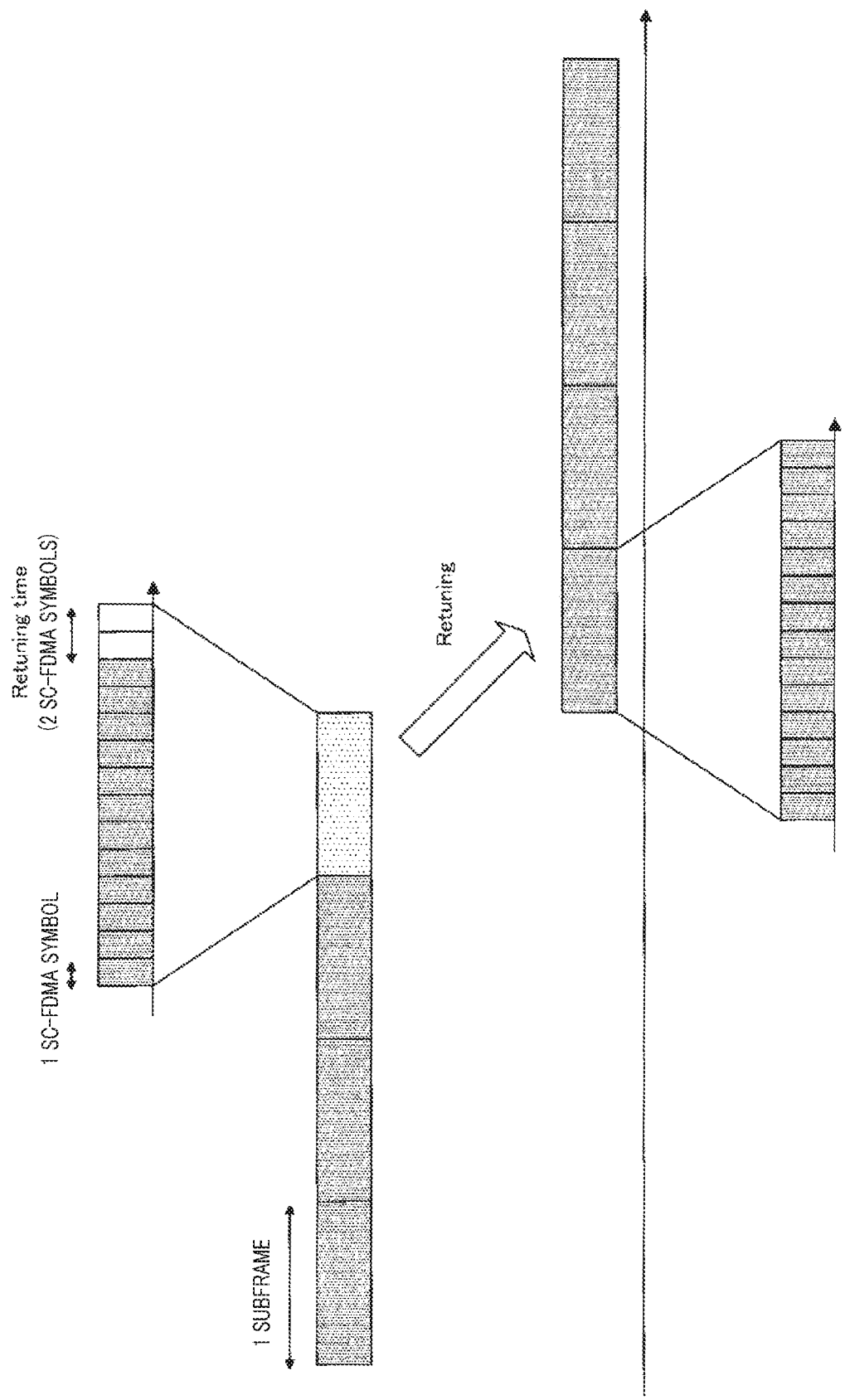
FIG. 4 illustrates an example of setting retuning time (Method 1)

Method 1 (FIG. 4): a method in which last two SC-FDMA symbols of one subframe immediately before retuning are discarded (punctured) and used for retuning time;

Method 2 (FIG. 5): a method in which first two SC-FDMA symbols of one subframe immediately after retuning are discarded and used for retuning time;

Method 3 (FIG. 6): a method in which the last SC-FDMA symbol of one subframe immediately before retuning and the first SC-FDMA symbol of one subframe immediately after retuning are discarded and used for retuning time; and Method 4 (FIG. 7): a method in which a guard subframe (one subframe) for retuning is provided.

Among the methods for securing retuning time described above, Method 4 requires retuning time corresponding to one subframe each time frequency hopping is performed. Therefore, in comparison with the other Methods 1 to 3, time (or the number of subframes) required to complete all repetition transmissions increases, and resource use efficiency decreases.

For example, when a frequency hopping period is Y subframes, the resource use efficiency in Method 4 is $(Y-1)/Y$. On the other hand, the resource use efficiency in Methods 1 to 3 is $(Y-1+(12/14))/Y$. Therefore, for example, in the case of Y=4, the resource use efficiency can be improved by about 28% in Methods 1 to 3 in comparison with Method 4.

There are two methods shown below as formats for transmitting data in a retuning subframe (a subframe one or two SC-FDMA symbols of which are to be used for retuning time) at the time of PUSCH repetition in Methods 1 to 3.

Figure 1:
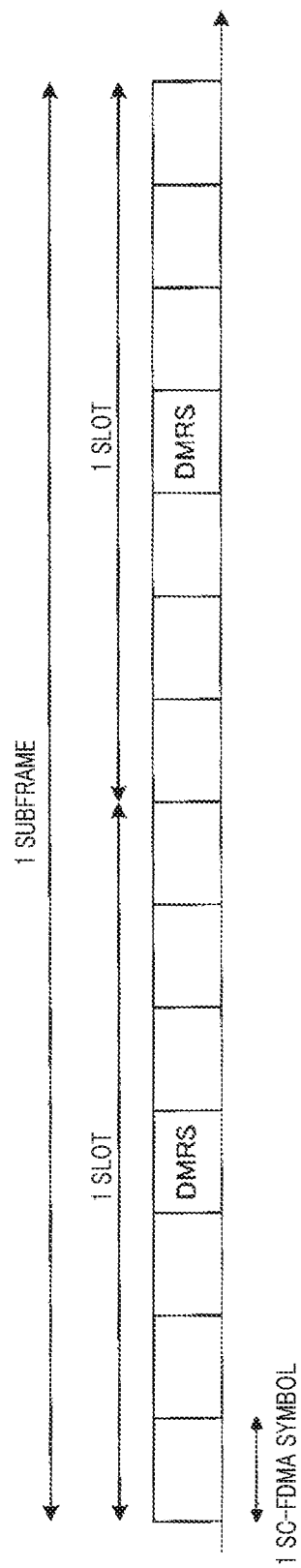
FIG. 1 illustrates an example of a configuration of a PUSCH subframe.
Figure 2:
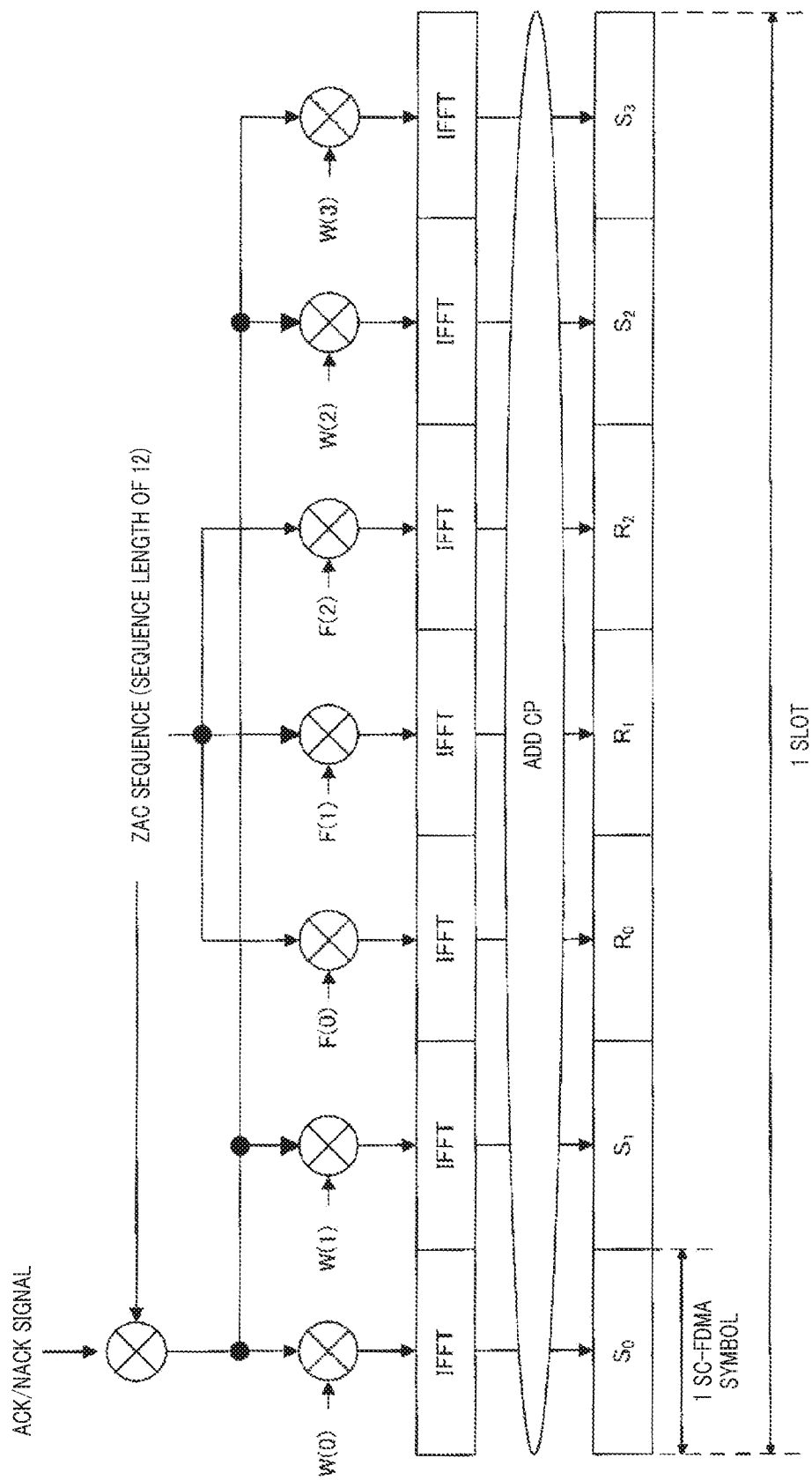
FIG. 2 illustrates an example of a response signal generation process in a PUCCH.
Figure 3:
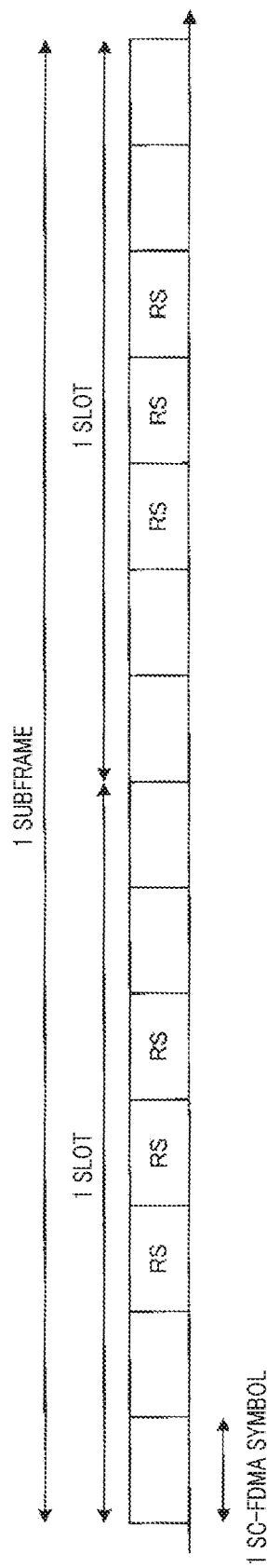
FIG. 3 illustrates an example of a configuration of a PUCCH format 1a/1b subframe.

The first method is a method in which, after mapping data to twelve SC-FDMA symbols excluding DMRS's as shown in FIG. 1 similarly to other subframes, an SC-FDMA symbol (or symbols) for retuning time is punctured. In this method, in a retuning subframe and in other subframes, the same signal is transmitted in symbols other than the SC-FDMA symbol (or symbols) punctured for retuning time is transmitted. Therefore, coherent combining can be easily realized on the base station side.

The second method is a method in which, as a format for transmitting data in a retuning subframe, a data encoding rate is changed to be different from that for other subframes, and data is mapped to ten or eleven SC-FDMA symbols excluding the SC-FDMA symbol (or symbols) for retuning time (rate matching). This method is used in existing LTE which does not assume repetition transmission, and, therefore, change from existing standards is not required. Since a different signal is transmitted in each symbol, in the retuning subframe (subframes) and in the other subframes, coherent combining cannot be performed on the base station side.

Since neither of the methods influences much on data transmission in a PUSCH, it is desirable to use any of Methods 1 to 3 in PUSCH repetition from a view point of the resource use efficiency.

Further, at the time of PUCCH repetition also, it is desirable to use any of Methods 1 to 3 from the view point of the resource use efficiency and a view point of commonness between operations of the PUCCH and the PUSCH. In Methods 1 to 3, however, since a part of an SC-FDMA symbol encoded with an OCC (Orthogonal Cover Code) sequence is not used, collapse of orthogonality between orthogonal sequences occurs, and there is a possibility that characteristics deteriorate due to interference among codes.

Therefore, in one aspect of the present disclosure, a terminal and a transmission method which are capable of securing retuning time while suppressing deterioration of transmission characteristics of an uplink signal (PUSCH or PUCCH) are provided.

[Outline of Communication System]

A communication system according to each embodiment of the present disclosure is provided with base station 100 and terminal 200 which are, for example, compatible with an LTE-Advanced system. Terminal 200 is an MTC terminal.

Figure 8:
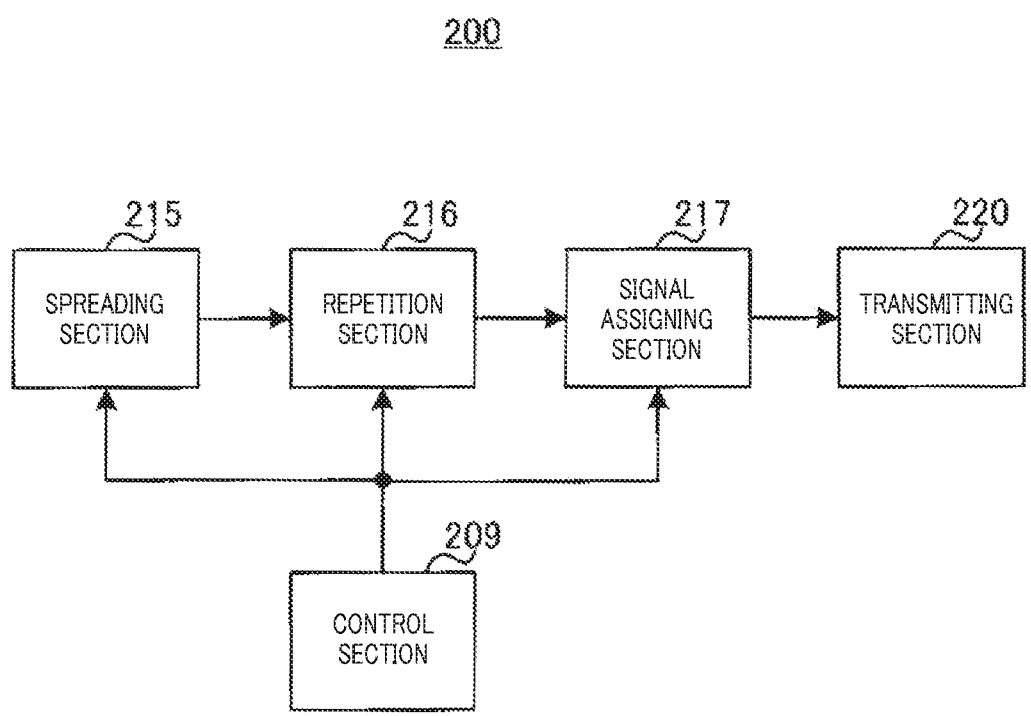
FIG. 8 is a block diagram showing a configuration of a main part of a terminal according to Embodiment 1.

FIG. 8 is a block diagram showing a configuration of a main part of terminal 200 according to each embodiment of the present disclosure. In terminal 200 shown in FIG. 8, spreading section 215 spreads an ACK/NACK signal for downlink data using any one of a plurality of orthogonal cover code sequences (OCC sequences). Repetition section 216 performs repetition over a plurality of subframes of the spread ACK/NACK signal. Signal assigning section 217 maps the repeated ACK/NACK signal to a narrowband for MTC terminals. If narrowbands to be used for a first subframe and a second subframe following the first subframe, among a plurality of subframes, are different (that is, in the case of performing retuning), control section 209 punctures the last two symbols of the first subframe or the first two symbols of the second subframe. Transmitting section 220 transmits the ACK/NACK signal in the narrowband. Each of the plurality of orthogonal cover code sequences is made up of a first partial sequence composed of codes corresponding to the first two symbols of a subframe and a second partial sequence composed of codes corresponding to the last two symbols, and, among the plurality of orthogonal cover code sequences, the first partial sequences and the second partial sequences are partially orthogonal to one another.

Embodiment 1

[Configuration of Base Station]

Figure 9:
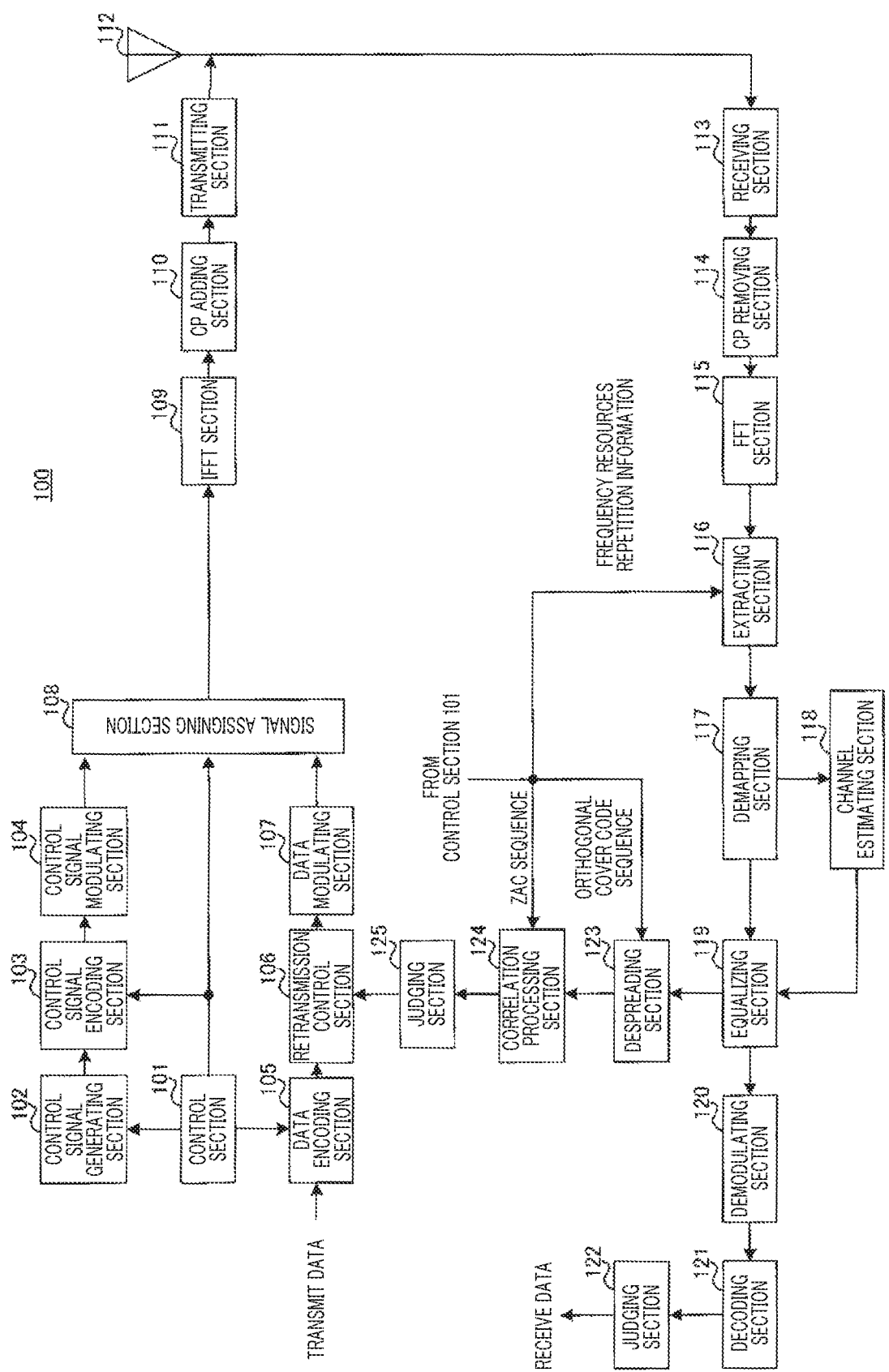
FIG. 9 is a block diagram showing a configuration of a base station according to Embodiment 1.

FIG. 9 is a block diagram showing a configuration of base station 100 according to Embodiment 1 of the present disclosure. In FIG. 9, base station 100 has control section 101, control signal generating section 102, control signal encoding section 103, control signal modulating section 104, data encoding section 105, retransmission control section 106, data modulating section 107, signal assigning section 108, IFFT (Inverse Fast Fourier Transform) section 109, CP (Cyclic Prefix) adding section 110, transmitting section 111, antenna 112, receiving section 113, CP removing section 114, FFT (Fast Fourier Transform) section 115, extracting section 116, demapping section 117, channel estimating section 118, equalizing section 119, demodulating section 120, decoding section 121, judging section 122, despreading section 123, correlation processing section 124 and judging section 125.

Control section 101 decides assignment of a PDSCH and a PUSCH to terminal 200. At this time, control section 101 decides frequency assignment resources, modulation/encoding methods and the like to be specified to terminal 200 and outputs information about the decided parameters to control signal generating section 102.

Further, control section 101 decides a coding rate for a control signal and outputs the decided coding rate to control signal encoding section 103. Further, control section 101 decides radio resources (downlink resources) to which the control signal and downlink data are to be mapped and outputs information about the decided radio resources to signal assigning section 108. Further, control section 101 decides a coding rate to be used at the time of transmitting the downlink data (data to be transmitted) for terminal 200, which is a resource assignment target, and outputs the decided coding rate to data encoding section 105.

Further, control section 101 decides a coverage enhancement level of terminal 200 (an MTC terminal) and outputs information about the decided coverage enhancement level or the number of repetitions required for PUSCH transmission or PUCCH transmission at the decided coverage enhancement level to control signal generating section 102 and extracting section 116. Further, control section 101 decides a frequency hopping method (on/off of frequency hopping, a frequency hopping period and the like) for PUSCH repetition transmission or PUCCH repetition transmission and outputs information about the decided frequency hopping method to control signal generating section 102.

Further, control section 101 decides resources (a cyclic shift, an orthogonal cover code sequence and a frequency) for terminal 200 to transmit a PUCCH. Control section 101 outputs an amount of cyclic shift (a ZAC sequence) which may be used for PUCCH transmission and the orthogonal cover code sequence to despreading section 123 and correlation processing section 124, respectively, and outputs information about frequency resources to be used for PUCCH transmission to extracting section 116. These pieces of information about PUCCH resources may be implicitly notified to terminal 200 or may be notified to terminal 200 (control section 209 to be described later) by signaling by a higher layer signaling to terminal 200.

Control signal generating section 102 generates a control signal for terminal 200. The control signal includes a signal of a cell-specific higher layer, a signal of a UE-specific higher layer, an uplink grant indicating assignment of a PUSCH or downlink assignment information indicating assignment of a PDSCH.

The uplink grant is made up of a plurality of bits and includes information indicating frequency assignment resources, modulation/coding schemes and the like. Further, the uplink grant may include information about a coverage enhancement level or information about the number of repetitions required for PUSCH transmission.

The downlink assignment information is made up of a plurality of bits and includes information indicating frequency assignment resources, modulation/coding schemes and the like. Further, the downlink assignment information may include information about a coverage enhancement level or information about the number of repetitions required for PUCCH transmission.

Control signal generating section 102 generates a control information bit sequence using control information inputted from control section 101 and outputs the generated control information bit sequence (a control signal) to control signal encoding section 103. Since the control information may be transmitted to a plurality of terminals 200, control signal generating section 102 includes a UE ID of each terminal 200 in control information for terminal 200 to generate a bit sequence. For example, a CRC (Cyclic Redundancy Check) bit masked by a UE ID of a destination terminal is added to the control information.

Control signal encoding section 103 encodes the control signal (the control information bit sequence) received from control signal generating section 102 according to the encoding rate specified from control section 101 and outputs the encoded control signal to control signal modulating section 104.

Control signal modulating section 104 modulates the control signal received from control signal encoding section 103 and outputs the modulated control signal (a symbol sequence) to signal assigning section 108.

Data encoding section 105 performs error correction coding with a Turbo code or the like for transmit data (downlink data) according to the coding rate received from control section 101 and outputs a data signal after the encoding to retransmission control section 106.

At the time of initial transmission, retransmission control section 106 holds the data signal after the encoding received from data encoding section 105 and also outputs the data signal to data modulating section 107. Retransmission control section 106 holds the data signal after the encoding for each destination terminal. Further, upon receipt of a NACK to the transmitted data signal from judging section 125, retransmission control section 106 outputs corresponding data which it holds to data modulating section 107. Upon receipt of an ACK to the transmitted data signal from judging section 125, retransmission control section 106 deletes the corresponding data which it holds.

Data modulating section 107 modulates the data signal received from retransmission control section 106 and outputs the modulated data signal to signal assigning section 108.

Signal assigning section 108 maps the control signal (the symbol sequence) received from control signal modulating section 104 and the modulated data signal received from data modulating section 107 to the radio resources specified from control section 101. A control channel to which the control signal is to be mapped may be either a PDCCH for MTC (a downlink control channel) or an EPDCCH (an Enhanced PDCCH). Signal assigning section 108 outputs a signal of downlink subframes which include a PDCCH for MTC or an EPDCCH to which the control signal is mapped, to IFFT section 109.

IFFT section 109 converts a frequency domain signal to a time domain signal by performing IFFT processing for the signal received from signal assigning section 108. IFFT section 109 outputs the time domain signal to CP adding section 110.

CP adding section 110 adds a CP to the signal received from IFFT section 109 and outputs the signal to which CP is added (an OFDM signal) to transmitting section 111.

Transmitting section 111 performs RF (Radio Frequency) processing such as D/A (Digital-to-Analog) conversion and upconversion for the OFDM signal received from CP adding section 110 and transmits a radio signal to terminal 200 via antenna 112.

Receiving section 113 performs RF processing such as downconversion and A/D (Analog-to-Digital) conversion for an uplink signal (PUSCH or PUCCH) from terminal 200 received via antenna 112 and outputs an obtained received signal to CP removing section 114. The uplink signal (PUSCH or PUCCH) transmitted from terminal 200 includes a repetition-processed signal over a plurality of subframes.

CP removing section 114 removes a CP added to the received signal received from receiving section 113 and outputs the signal from which the CP has been removed, to FFT section 115.

FFT section 115 applies FFT processing to the signal received from CP removing section 114, transforms the signal into a frequency-domain signal sequence and takes out a signal corresponding to PUSCH or PUCCH subframes. FFT section 115 outputs the obtained signal to extracting section 116.

Extracting section 116 extracts a PUSCH or a PUCCH based on information about PUSCH or PUCCH resources inputted from control section 101. Further, extracting section 116 combines the plurality of subframes of the PUSCH or the PUCCH which have been repetition-transmitted, using information about the repetition transmission of the PUSCH or the PUCCH (repetition information) inputted from control section 101. Extracting section 116 outputs the combined signal to demapping section 117.

Demapping section 117 extracts a PUSCH portion assigned to terminal 200 from the signal received from extracting section 116. Further, demapping section 117 disassembles the extracted PUSCH for terminal 200 into DMRS's and data symbols, outputs the DMRS's to channel estimating section 118 and outputs the data symbols (SC-FDMA data symbols) to equalizing section 119. Further, demapping section 117 disassembles the PUCCH received from extracting section 116 into DMRS's and an ACK/NACK signal, outputs the DMRS's to channel estimating section 118 and outputs the ACK/NACK signal to equalizing section 119.

Channel estimating section 118 performs channel estimation using the DMRS's inputted from demapping section 117. Channel estimating section 118 outputs an obtained channel estimate to equalizing section 119.

Equalizing section 119 performs equalization of the SC-FDMA data symbols or the ACK/NACK signal inputted from demapping section 117 using the channel estimate inputted from channel estimating section 118. Equalizing section 119 outputs the equalized SC-FDMA data symbols to demodulating section 120 and outputs the equalized ACK/NACK signal to despreading section 123.

Demodulating section 120 applies IDFT to the frequency-domain SC-FDMA data symbols inputted from equalizing section 119 to convert the frequency-domain SC-FDMA data symbols to a time domain signal (a symbol sequence) and, after that, performs data demodulation. Specifically, demodulating section 120 converts the symbol sequence to a bit sequence based on a modulation scheme specified to terminal 200 and outputs the obtained bit sequence to decoding section 121.

Decoding section 121 performs error correction decoding for the bit sequence inputted from demodulating section 120 and outputs the decoded bit sequence to judging section 122.

Judging section 122 performs error detection for the bit sequence inputted from decoding section 121. The error detection is performed using a CRC bit added to the bit sequence. If a result of judgment of the CRC bit indicates that there is no error, judging section 122 takes out receive data and notifies control section 101 of an ACK (not shown). On the other hand, if the result of the judgment of the CRC bit indicates that there is an error, judging section 122 notifies control section 101 of a NACK (not shown).

Despreading section 123 despreads a signal of a part of the signal received from equalizing section 119, which corresponds to the ACK/NACK signal, using an orthogonal cover code sequence (an orthogonal cover code sequence which terminal 200 should use) received from control section 101 and outputs the despread signal to correlation processing section 124.

Correlation processing section 124 determines a correlation value between the ZAC sequence (a ZAC sequence which terminal 200 may use; the amount of cyclic shift) inputted from control section 101 and the signal inputted from despreading section 123 and outputs the correlation value to judging section 125.

Judging section 125 judges which of ACK and NACK the ACK/NACK signal transmitted from terminal 200 shows for the transmitted data, based on the correlation value received from correlation processing section 124. Judging section 125 outputs a judgment result to retransmission control section 106.

[Configuration of Terminal]

Figure 10:
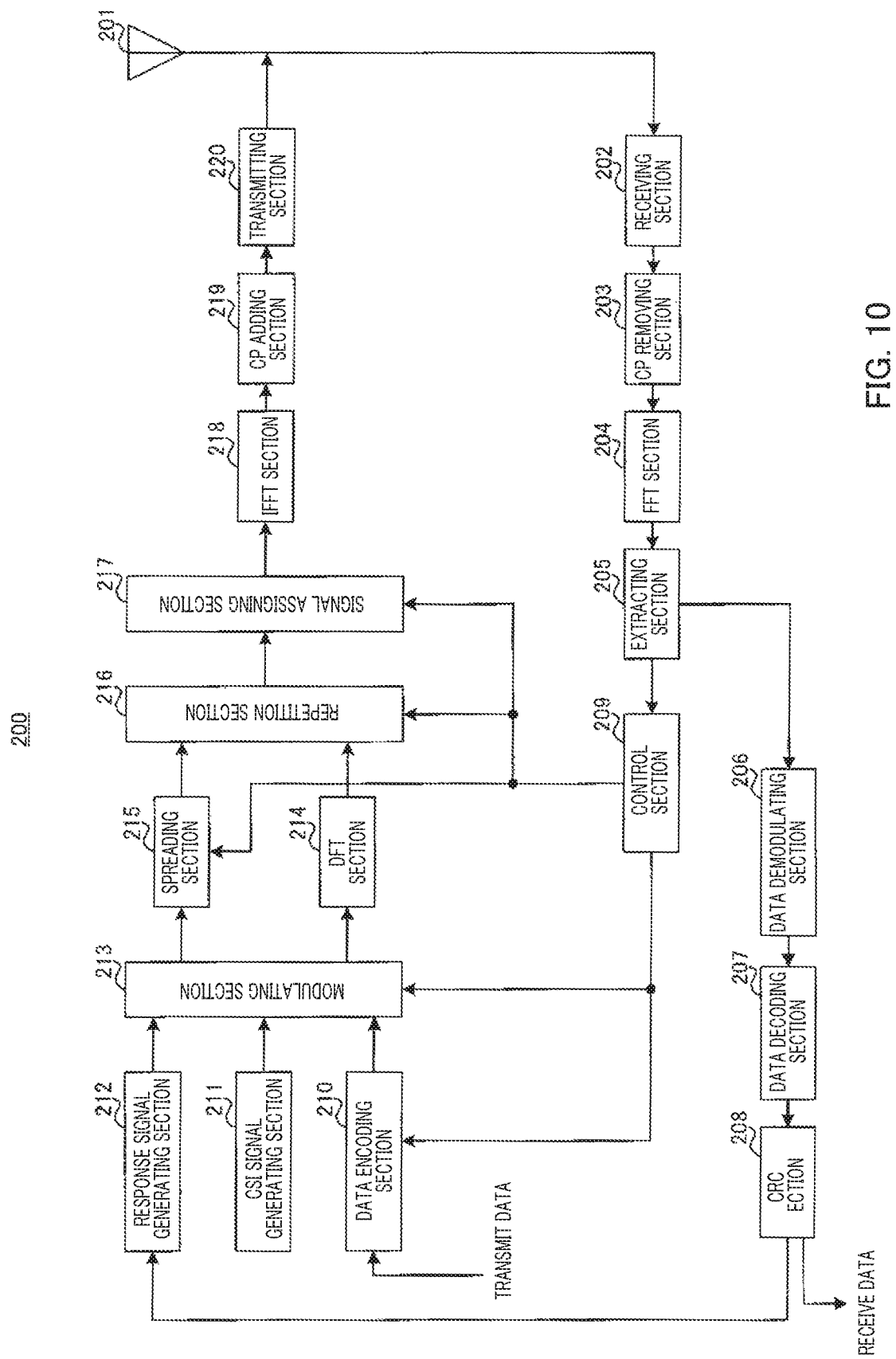
FIG. 10 is a block diagram showing a configuration of the terminal according to Embodiment 1.

FIG. 10 is a block diagram showing a configuration of terminal 200 according to Embodiment 1 of the present disclosure. In FIG. 9, terminal 200 has antenna 201, receiving section 202, CP removing section 203, FFT section 204, extracting section 205, data demodulating section 206, data decoding section 207, CRC section 208, control section 209, data encoding section 210, CSI signal generating section 211, response signal generating section 212, modulating section 213, DFT section 214, spreading section 215, repetition section 216, signal assigning section 217, IFFT section 218, CP adding section 219 and transmitting section 220.

Receiving section 202 performs RF processing such as downconversion or AD conversion for a radio signal (a PDCCH for MTC or EPDCCH) and a data signal (a PDSCH) from base station 100 received via antenna 201 to obtain a baseband OFDM signal. Receiving section 202 outputs the OFDM signal to CP removing section 203.

CP removing section 203 removes a CP added to the OFDM signal received from receiving section 202 and outputs the signal from which the CP has been removed to FFT section 204.

FFT section 204 converts a time domain signal to a frequency domain signal by performing FFT processing for the signal received from CP removing section 203. FFT section 204 outputs the frequency domain signal to extracting section 205.

Extracting section 205 extracts a PDCCH for MTC or EPDCCH from the frequency domain signal received from FFT section 204, performs blind decoding for the PDCCH for MTC or EPDCCH to attempt decoding of a control signal destined to its own terminal 200. A CRC masked by the UE ID of terminal 200 is added to the control signal destined to terminal 200. Therefore, if a CRC judgment indicates OK as a result of performing blind decoding, extracting section 205 extracts control information and outputs the control information to control section 209. Further, extracting section 205 extracts downlink data (a PDSCH signal) from the signal received from FFT section 204 and outputs the downlink data to data demodulating section 206.

Data demodulating section 206 demodulates the downlink data received from extracting section 205 and outputs the demodulated downlink data to data decoding section 207.

Data decoding section 207 decodes the downlink data received from data demodulating section 206 and outputs the decoded downlink data to CRC section 208.

CRC section 208 performs error detection for the downlink data received from data decoding section 207 using CRC, and outputs an error detection result to response signal generating section 212. Further, if the downlink data is judged to be without an error, CRC section 208 outputs the downlink data as receive data.

Control section 209 performs control of PUSCH transmission based on the control signal inputted from extracting section 205. Specifically, control section 209 specifies resource assignment at the time of PUSCH transmission to signal assigning section 217 based on PUSCH resource assignment information included in the control signal. Further, control section 209 specifies a coding scheme and a modulation scheme at the time of PUSCH transmission to data encoding section 210 and modulating section 213, respectively, based on information about the coding scheme and the modulation scheme included in the control signal. Further, control section 209 decides the number of repetitions at the time of PUSCH repetition transmission based on information about a coverage enhancement level or the number of repetitions required for PUSCH transmission included in the control signal, and specifies information about the decided number of repetitions to repetition section 216. Further, control section 209 specifies frequency hopping for PUSCH repetition to repetition section 216 based on information about a frequency hopping method included in the control signal.

Further, control section 209 performs control of PUCCH transmission based on the control signal inputted from extracting section 205. Specifically, control section 209 identifies PUCCH resources (a frequency, an amount of cyclic shift and an orthogonal cover code sequence) based on information about the PUCCH resources included in the control signal, and specifies the identified information to spreading section 215 and signal assigning section 217. Further, control section 209 decides the number of repetitions at the time of PUCCH repetition transmission based on information about a coverage enhancement level or information about the number of repetitions required for PUCCH transmission, and specifies information about the decided number of repetitions to repetition section 216. Further, control section 209 specifies frequency hopping for PUCCH repetition to repetition section 216 based on the information about the frequency hopping method included in the control signal. Further, control section 209 specifies a transmission format for each subframe in PUCCH repetition to spreading section 215.

Data encoding section 210 adds a CRC bit masked by the UE ID of terminal 200 to inputted transmit data, performs error correction coding and outputs an encoded bit sequence to modulating section 213.

CSI signal generating section 211 generates CSI feedback information based on a CSI measurement result of terminal 200 and outputs the CSI feedback information to modulating section 213.

Response signal generating section 212 generates a response signal (an ACK/NACK signal) to received downlink data (a PDSCH signal) based on an error detection result received from CRC section 208. Specifically, response signal generating section 212 generates a NACK if an error is detected, and generates an ACK if an error is not detected. Response signal generating section 212 outputs the generated ACK/NACK signal to modulating section 213.

Modulating section 213 modulates the bit sequence received from data encoding section 210 and outputs a modulated signal (a symbol sequence) to DFT section 214. Further, modulating section 213 modulates the CSI feedback information received from CSI signal generating section 211 and the ACK/NACK signal received from response signal generating section 212 and outputs a modulated signal (a symbol sequence) to spreading section 215.

DFT section 214 applies DFT to the signal inputted from modulating section 213 to generate a frequency domain signal, and outputs the frequency domain signal to repetition section 216.

Spreading section 215 spreads a reference signal, and the CSI feedback information and ACK/NACK signal received from modulating section 213, using a ZAC sequence defined by the amount of cyclic shift set by control section 209 and an orthogonal cover code sequence, and outputs the spread signal to repetition section 216. At this time, spreading section 215 spreads the ACK/NACK signal using the transmission format for each subframe in PUCCH repetition set by control section 209.

When its own terminal is in an MTC coverage enhancement mode, repetition section 216 performs repetition of a signal inputted from DFT section 214 or spreading section 215 over a plurality of subframes, based on the number of repetitions specified from control section 209 to generate a repetition signal. Repetition section 216 outputs the repetition signal to signal assigning section 217.

Signal assigning section 217 maps the signal received from repetition section 216 to PUSCH or PUCCH time/frequency resources specified from control section 209. Signal assigning section 217 outputs a PUSCH or PUCCH signal to which the signal is mapped, to IFFT section 218.

IFFT section 218 generates a time domain signal by performing IFFT processing for the frequency domain PUSCH or PUCCH signal inputted from signal assigning section 217. IFFT section 218 outputs the generated signal to CP adding section 219.

CP adding section 219 adds a CP to the time domain signal received from IFFT section 218 and outputs the signal to which the CP is added, to transmitting section 220.

Transmitting section 220 performs RF processing such as D/A conversion and upconversion for the signal received from CP adding section 219 and transmits a radio signal to base station 100 via antenna 201.

[Operations of Base Station 100 and Terminal 200]

Operations of base station 100 and terminal 200 having the above configurations will be described in detail.

In the present embodiment, Method 1 (FIG. 4) or Method 2 (FIG. 5) among Methods 1 to 4 for securing retuning time described above will be used. In other words, in the case of switching a narrowband to be used by frequency hopping, terminal 200 (control section 209) may discard the last two SC-FDMA data symbols of one subframe immediately before retuning to use the SC-FDMA data symbols for retuning time or may discard the first two SC-FDMA data symbols of one subframe immediately after retuning to use the SC-FDMA data symbols for retuning time.

Base station 100 indicates terminal 200 of the number of PUSCH repetitions ($N_{PUSCH}$) or the number of PUCCH repetitions ($N_{PUCCH}$) in advance before PUSCH or PUCCH transmission/reception. The number of repetitions $N_{PUSCH}$ or $N_{PUCCH}$ may be indicated to terminal 200 from base station 100 via a UE-specific higher layer or may be indicated using a PDCCH for MTC.

Further, base station 100 indicates terminal 200 of a frequency hopping method (on/off of frequency hopping and a frequency hopping period Y) in advance before PUSCH or PUCCH transmission/reception. The frequency hopping period Y may be indicated to terminal 200 via a cell-specific higher layer by base station 100 as a cell-specific parameter or indicated to terminal 200 via a UE-specific higher layer by base station 100 as a UE-specific parameter. Further, the frequency hopping period Y may be a parameter predefined according to standards.

Terminal 200 performs PUSCH or PUCCH repetition transmission for the number of times corresponding to the number of repetitions indicated from base station 100 ($N_{PUSCH}$ or $N_{PUCCH}$).

Figure 5:
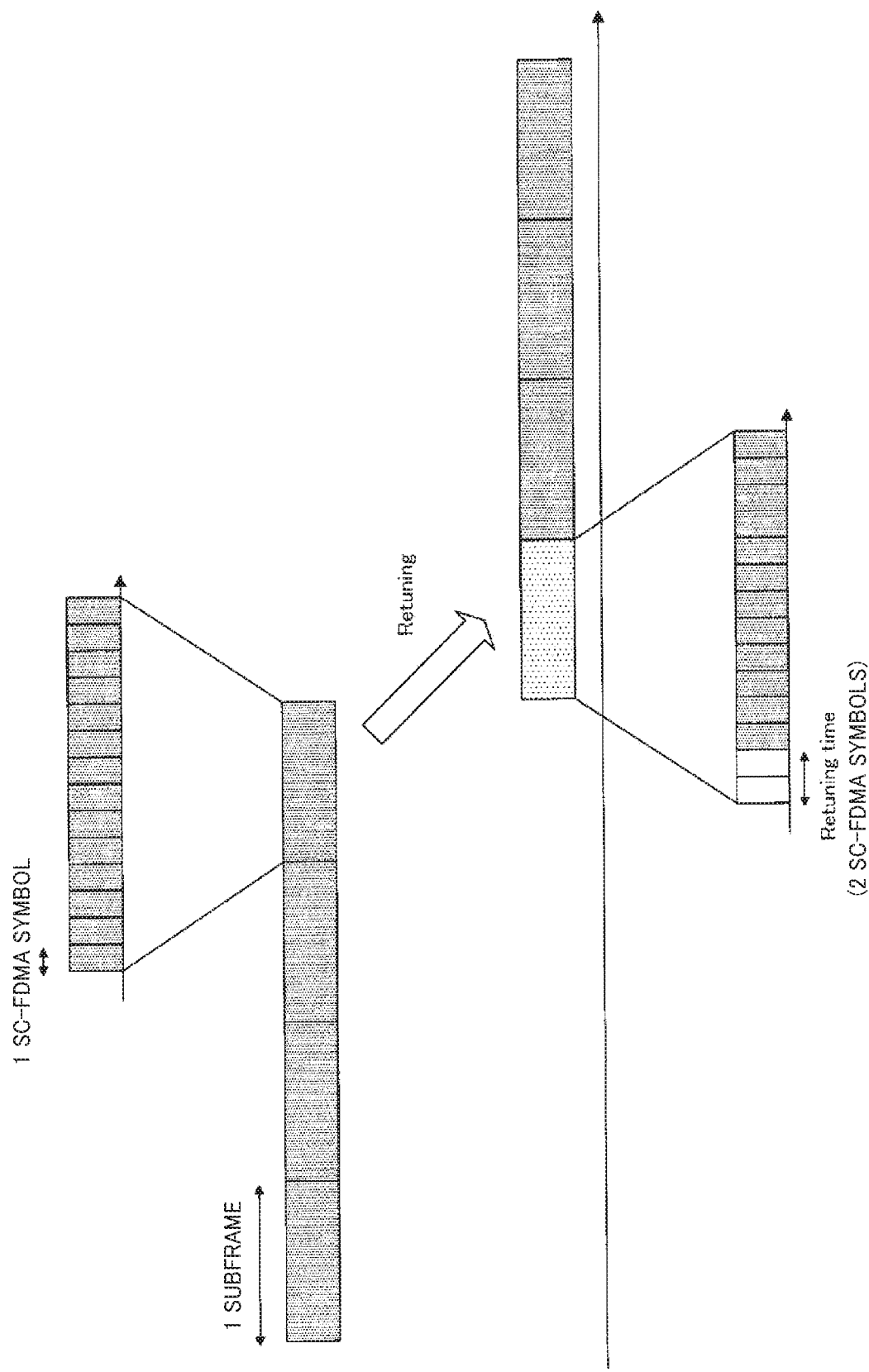
FIG. 5 illustrates an example of setting retuning time (Method 2)

Further, if frequency hopping is on, and the number of repetitions PUSCH or $N_{PUCCH}$) is larger than Y, terminal 200 changes a 1.4-MHz frequency band which terminal 200 uses to transmit a repetition signal (performs frequency hopping) after transmitting a repetition signal in consecutive Y subframes using the same resources, and transmits a repetition signal again in consecutive Y subframes using the same resources. At the time of performing frequency hopping, terminal 200 secures retuning time corresponding to two SC-FDMA data symbols immediately before or immediately after retuning according to Method 1 (FIG. 4) or Method 2 (FIG. 5).

<In the Case of PUSCH Repetition>

At the time of PUSCH repetition, terminal 200 maps data to twelve SC-FDMA data symbols excluding DMRS's (see, for example, FIG. 1) in a retuning subframe (one subframe immediately before retuning in Method 1, and one subframe immediately after retuning in Method 2) and, after that, punctures two SC-FDMA data symbols for retuning time (the last two symbols in the subframe in Method 1, and the first two symbols in the subframe in Method 2).

Otherwise, terminal 200 maps the data to ten SC-FDMA data symbols excluding DMRS's and two SC-FDMA data symbols for retuning time in the retuning subframe (rate matching).

<In the Case of PUCCH Repetition>

At the time of PUCCH repetition, terminal 200 maps an ACK/NACK signal and a reference signal in a retuning subframe with a normal PUCCH format and, after that, punctures two SC-FDMA symbols for retuning time.

Figure 11:
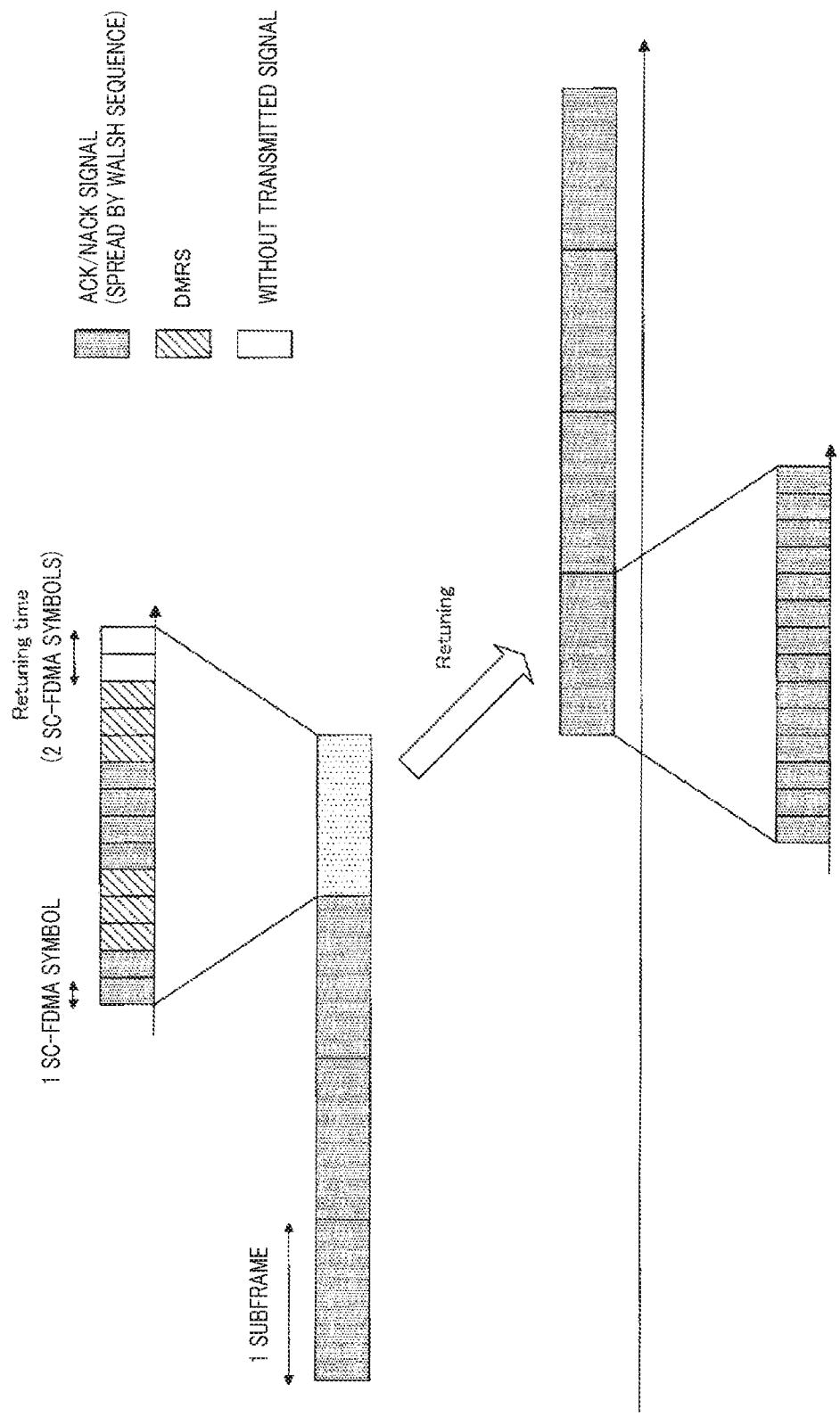
FIG. 11 illustrates an example of frequency hopping according to Embodiment 1.

FIG. 11 shows a state of frequency hopping in PUCCH repetition in the case of Method 1 and Y=4. As shown in FIG. 11, upon transmission of a repetition signal in consecutive subframes of Y=4, terminal 200 changes a frequency band by frequency hopping and transmits a repetition signal again in consecutive four subframes. In Method 1, terminal 200 punctures two SC-FDMA symbols of immediately before retuning (that is, the last two) of one subframe immediately before retuning.

Further, in the present embodiment, terminal 200 limits the number of candidates for an orthogonal cover code sequence to be used to spread an ACK/NACK signal to two.

For example, terminal 200 sets an orthogonal cover code sequence to be used to spread an ACK/NACK from between two candidates of (W(0), W(1), W(2), W(3))=(1, 1, 1, 1) and (1, −1, 1, −1) as candidates for an orthogonal cover code sequence or from between two candidates of (W(0), W(1), W(2), W(3))=(1, 1, 1, 1) and (1, −1, −1, 1).

Here, a partial sequence (1, 1) composed of two codes of the former half of the orthogonal cover code sequence (1, 1, 1, 1) is orthogonal to each of a partial sequence (1, −1) composed of two codes of the former half of the orthogonal cover code sequence (1, −1, 1, −1) and a partial sequence (1, −1) composed of two codes of the former half of the orthogonal cover code sequence (1, −1, −1, 1). Further, a partial sequence (1, 1) composed of two codes of the latter half of the orthogonal cover code sequence (1, 1, 1, 1) is orthogonal to each of a partial sequence (1, −1) composed of two codes of the latter half of the orthogonal cover code sequence (1, −1, 1, −1) and a partial sequence (−1, 1) composed of two codes of the latter half of the orthogonal cover code sequence (1, −1, −1, 1).

That is, the orthogonal cover code sequence (1, 1, 1, 1) is partially orthogonal to the orthogonal cover code sequence (1, −1, 1, −1) and the orthogonal cover code sequence (1, −1, −1, 1). Between orthogonal cover code sequences which are partially orthogonal to each other, sequences each of which includes two symbols of the former half of four symbols corresponding to a sequence length (sequences each of which is composed of two codes of the former half) are orthogonal to each other, and sequences each of which includes two symbols of the latter half (sequences each of which is composed of the two codes of the latter half) are also orthogonal to each other.

That is, terminal 200 (spreading section 215) spreads an ACK/NACK signal using any of such a plurality of orthogonal cover code sequences that their partial sequences each of which is composed of codes corresponding to the first two symbols of a subframe (sequences each of which corresponds to two symbols of the former half) are mutually partially orthogonal, and their partial sequences each of which is composed of codes corresponding to the last two symbols (sequences each of which corresponds to two symbols of the latter half) are mutually partially orthogonal.

Thereby, by separating two-symbol former halves and two-symbol latter halves, base station 100 can separate a plurality of ACK/NACK signals code-multiplexed by orthogonal cover code sequences. Therefore, even if the last two SC-FDMA symbols (Method 1) or the first two SC-FDMA symbols (Method 2) are punctured in a retuning subframe to transmit a signal, collapse of orthogonality does not occur between orthogonal cover code sequences which are mutually partially orthogonal to each other. In other words, even if any one of the sequence of the former-half two symbols among four symbols corresponding to a sequence length and the sequence of the latter-half two symbols is punctured, collapse of orthogonality does not occur in the other sequence.

Here, for example, an orthogonal cover code sequence to be used in an existing LTE terminal (an OCC sequence) is derived from a PUCCH resource index with the following equations.

[1]

$$n_{oc} = \lfloor n' \cdot \Delta_{shift}^{PUCCH}/N' \rfloor \quad (1)$$

[2]

$$N' = \begin{cases} N_{CS}^{(1)} & \text{if } n_{PUCCH}^{(1)} < c \cdot N_{CS}^{(1)}/\Delta_{shift}^{PUCCH} \\ N_{SC}^{RB} & \text{otherwise} \end{cases} \quad (2)$$

$$c = 3$$

[3]

$$n' = \begin{cases} n_{PUCCH}^{(1)} & \text{if } n_{PUCCH}^{(1)} < c \cdot \\ & N_{CS}^{(1)}/\Delta_{shift}^{PUCCH} \\ (n_{PUCCH}^{(1)} - c \cdot N_{CS}^{(1)}/\Delta_{shift}^{PUCCH}) & \text{otherwise} \\ \mod(c \cdot N_{SC}^{RB}/\Delta_{shift}^{PUCCH}) \end{cases} \quad (3)$$

In equations 1 to 3, noc indicates an OCC index; noc=0 indicates (1, 1, 1, 1); noc=1 indicates (1, −1, 1, −1); and noc=2 indicates (1, −1, −1, 1). Further, $\Delta_{shift}^{PUCCH}$ indicates a gap between adjacent amounts of cyclic shift; $N_{CS}^{(1)}$ indicates an amount of cyclic shift used for PUCCH format 1/1a/1b; $N_{SC}^{RB}$ indicates the number of subcarriers per one RB; and $n_{PUCCH}^{(1)}$ indicates a PUCCH resource index.

Further, in the above equation, c=3 indicates the number of terminals which can be multiplexed by an orthogonal cover code sequence, that is, the number of candidates for an orthogonal cover code sequence to spread an ACK/NACK signal. Therefore, in the present embodiment, c=2 is assumed in the above equation as the number of terminals 200 (MTC terminals) to which frequency hopping is to be applied, and the number of candidates for an orthogonal cover code sequence to spread an ACK/NACK signal can be restricted to two by deriving OCC indices from PUCCH resource indices.

As described above, in the present embodiment, in the case where frequency hopping is applied at the time of uplink repetition transmission, terminal 200 punctures the last two SC-FDMA symbols or the first two SC-FDMA symbols of a retuning subframe to transmit a signal. At this time, terminal 200 restricts an orthogonal cover code sequence to spread an ACK/NACK signal in a PUCCH to two orthogonal cover code sequences which are partially orthogonal to each other. Thereby, it is possible to secure retuning time for changing the 1.4-MHz frequency band which terminal 200 uses to transmit a repetition signal, without causing collapse of orthogonality due to puncture to occur. Therefore, according to the present embodiment, it is possible to secure retuning time while suppressing deterioration of transmission characteristics of an uplink signal (PUSCH or PUCCH).

Embodiment 2

Since basic configurations of a base station and a terminal according to the present embodiment are the same as those of base station 100 and terminal 200 according to Embodiment 1, the base station and the terminal will be described with reference to FIGS. 9 and 10 again.

In the present embodiment, Method 3 (FIG. 6) among Methods 1 to 4 for securing retuning time described above will be used. In other words, in the case of switching a narrowband to be used by frequency hopping, terminal 200 (control section 209) discards (punctures) the last SC-FDMA data symbol of one subframe immediately before retuning and the first SC-FDMA data symbol of one subframe immediately after retuning to use the SC-FDMA data symbols for retuning time.

Base station 100 indicates terminal 200 of the number of PUSCH repetitions ($N_{PUSCH}$) or the number of PUCCH repetitions ($N_{PUCCH}$) in advance before PUSCH or PUCCH transmission/reception. The number of repetitions $N_{PUSCH}$ or $N_{PUCCH}$ may be indicated to terminal 200 from base station 100 via a UE-specific higher layer or may be indicated using PDCCH for MTC.

Further, base station 100 indicates terminal 200 of a frequency hopping method (on/off of frequency hopping and a frequency hopping period Y) before PUSCH or PUCCH transmission/reception. The frequency hopping period Y may be indicated to terminal 200 via a cell-specific higher layer by base station 100 as a cell-specific parameter or indicated to terminal 200 via a UE-specific higher layer by base station 100 as a UE-specific parameter. Further, the frequency hopping period Y may be a parameter predefined according to standards.

Terminal 200 performs repetition transmission of a PUSCH or a PUCCH the number of times corresponding to the number of repetitions indicated from base station 100 ($N_{PUSCH}$ or $N_{PUCCH}$).

Figure 6:
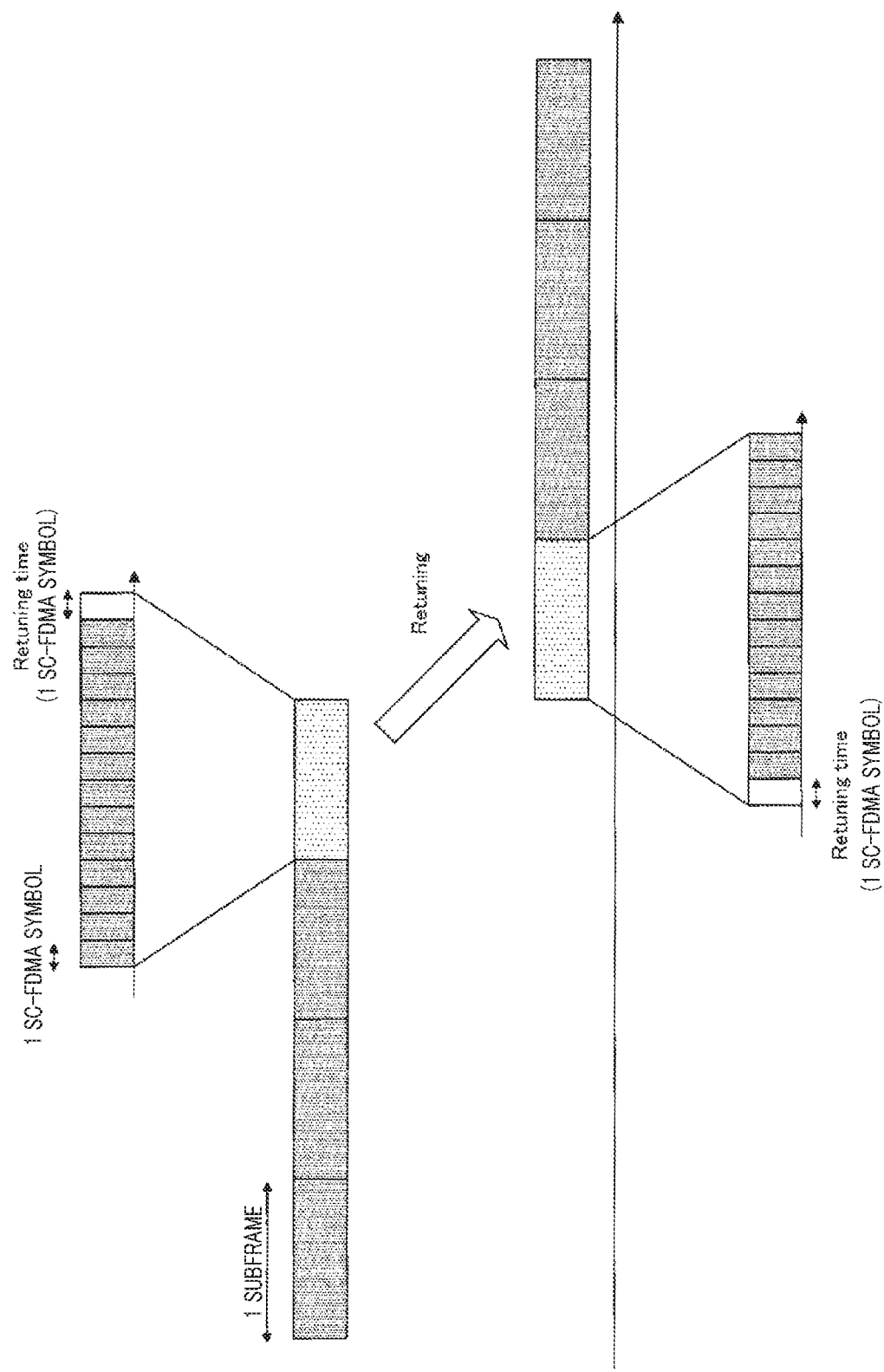
FIG. 6 illustrates an example of setting retuning time (Method 3)
Figure 7:
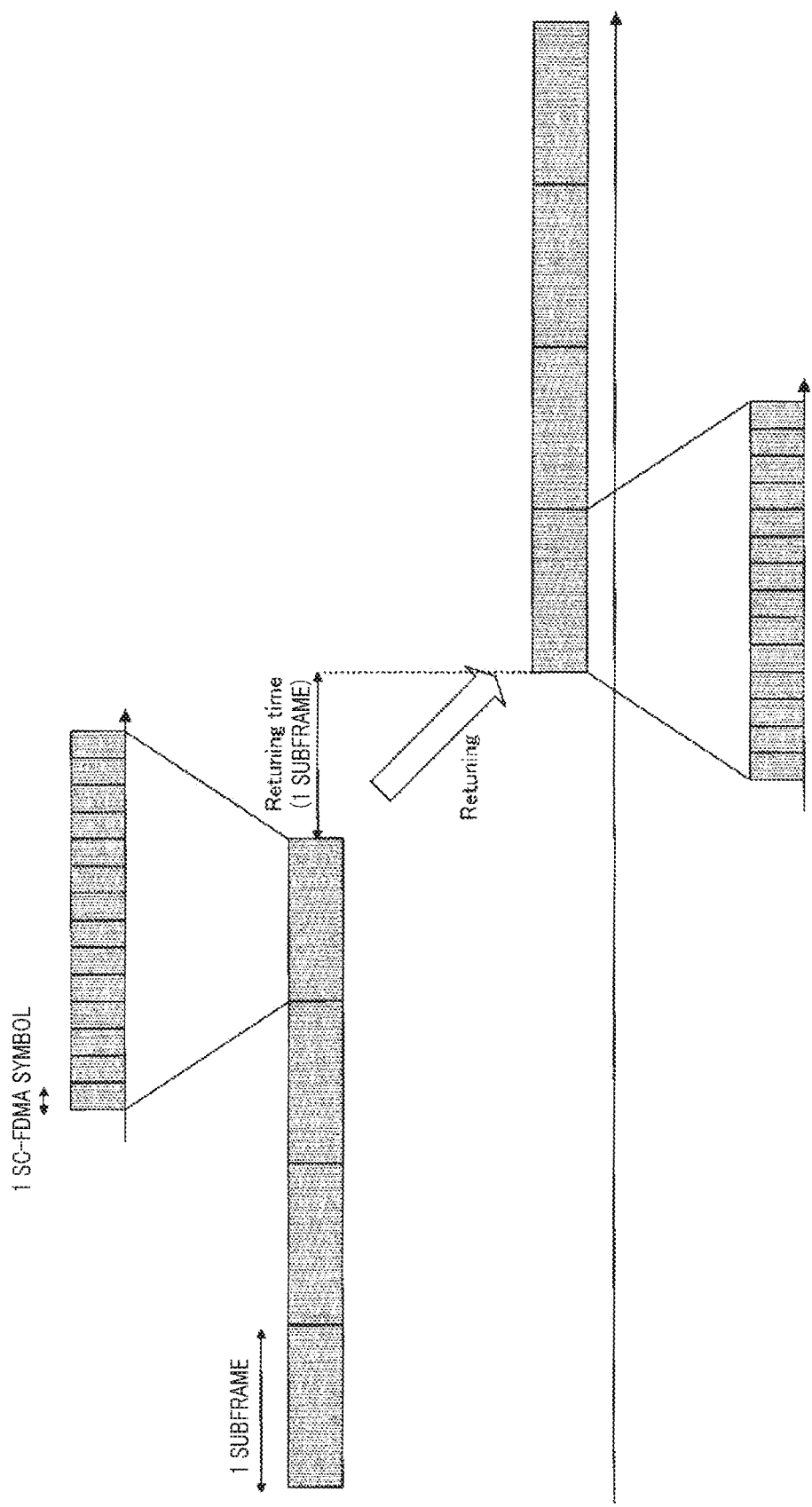
FIG. 7 illustrates an example of setting retuning time (Method 4)

Further, if frequency hopping is on, and the number of repetitions ($N_{PUSCH}$ or $N_{PUCCH}$) is larger than Y, terminal 200 changes the 1.4-MHz frequency band which terminal 200 uses to transmit a repetition signal (performs frequency hopping) after transmitting a repetition signal in consecutive Y subframes using the same resources, and transmits a repetition signal again in consecutive Y subframes using the same resources. At the time of performing frequency hopping, terminal 200 secures retuning time corresponding to two SC-FDMA data symbols in one subframe immediately before retuning and one subframe immediately after retuning according to Method 3 (FIG. 6).

<In the Case of PUSCH Repetition>

At the time of PUSCH repetition, terminal 200 maps data to twelve SC-FDMA data symbols excluding DMRS's (see, for example, FIG. 1) in a retuning subframe (one subframe immediately before retuning and one subframe immediately after retuning) and, after that, punctures two SC-FDMA data symbols for retuning time (one SC-FDMA data symbol in each retuning subframe).

Otherwise, terminal 200 maps the data to eleven SC-FDMA data symbols excluding DMRS's and one SC-FDMA data symbol for retuning time in the retuning subframe (rate matching).

<In the Case of PUCCH Repetition>

At the time of PUCCH repetition, terminal 200 spreads and maps an ACK/NACK signal in a retuning subframe of a former half (one subframe immediately before retuning) with a shortened PUCCH format specified in Rel-12 and, after that, punctures the last SC-FDMA symbol for retuning time.

On the other hand, terminal 200 spreads the ACK/NACK signal in a retuning subframe of a latter half (one subframe immediately after retuning) with a shortened PUCCH format specified in Rel-12 and, after that, maps the spread ACK/NACK signal to seven SC-FDMA symbols excluding the first SC-FDMA symbol for retuning time and DMRS's.

That is, terminal 200 (spreading section 215) spreads the ACK/NACK signal mapped to retuning subframes of the former half and the latter half with the shortened PUCCH format. Then, terminal 200 (transmitting section 220) transmits the ACK/NACK signal mapped according to the shortened PUCCH format in the retuning subframe of the former half, and transmits the ACK/NACK signal in symbols other than the first symbol, in the retuning subframe of the latter half.

Figure 12:
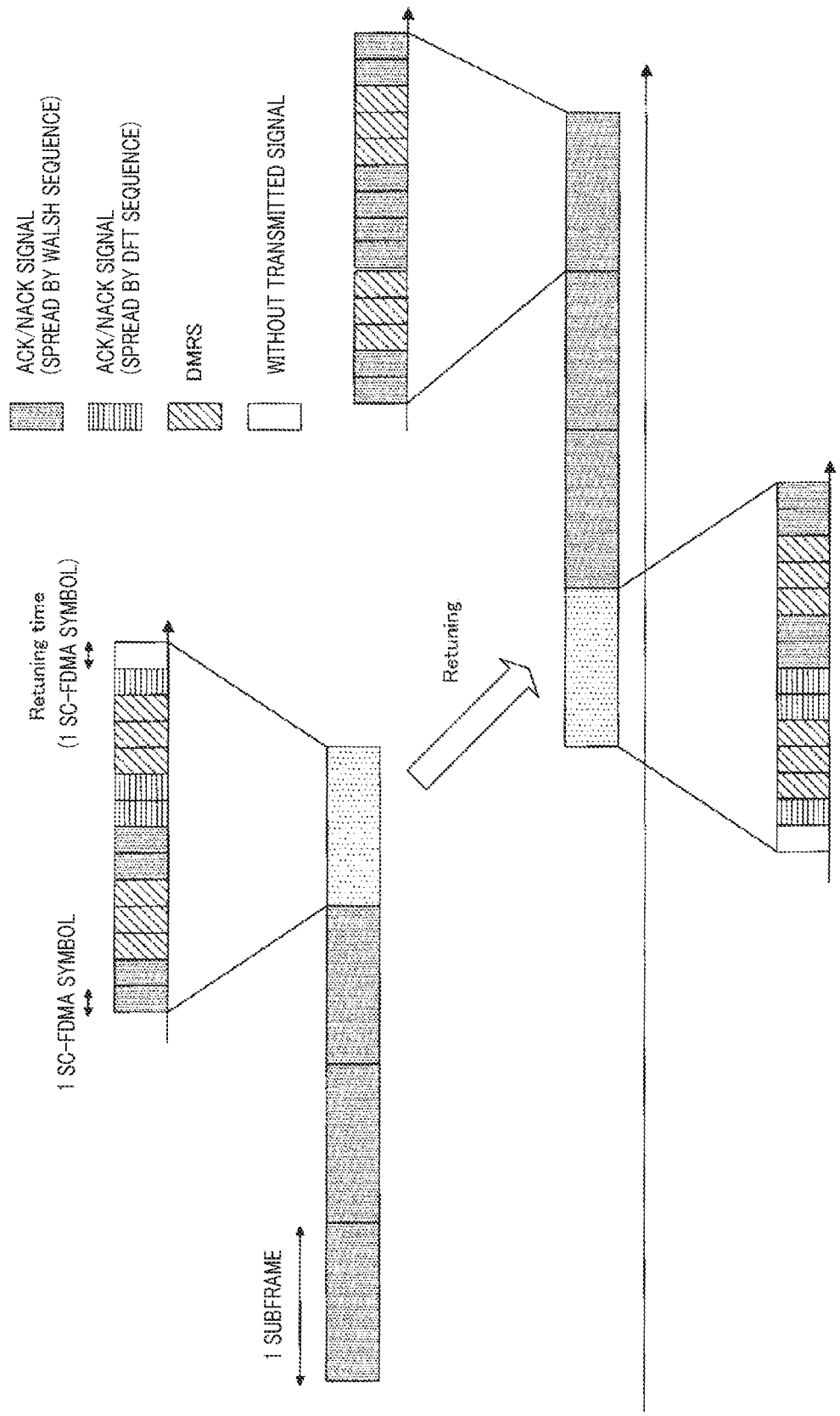
FIG. 12 illustrates an example of frequency hopping according to Embodiment 2.

FIG. 12 shows a state of frequency hopping in PUCCH repetition in the case of Method 3 and Y=4. As shown in FIG. 12, upon transmission of a repetition signal in consecutive subframes of Y=4, terminal 200 changes a frequency band by frequency hopping and transmits a repetition signal again in consecutive four subframes. At this time, terminal 200 punctures the last SC-FDMA symbol of one subframe immediately before retuning and the first SC-FDMA data symbol of one subframe immediately after retuning.

Further, as shown in FIG. 12, in the retuning subframe of the former half, the ACK/NACK signal is spread and mapped with the shortened PUCCH format. In the shortened PUCCH format, an ACK/NACK signal is spread with a Walsh sequence with a sequence length of 4, which is the same sequence length as the normal PUCCH format in a former-half slot of a subframe, and the ACK/NACK signal is spread with a DFT sequence with a sequence length of 3 in a latter-half slot of the subframe. Therefore, in the one subframe (fourteen symbols), a total number of symbols of the spread ACK/NACK signal (seven symbols) and DMRS's (six symbols) is thirteen symbols. In other words, by using the shortened PUCCH format, the last symbol of the one subframe is not used and can be secured as one symbol for retuning time.

On the other hand, in the retuning subframe of the latter half, the ACK/NACK signal is spread with a Walsh sequence with a sequence length of 4 and a DFT sequence with a sequence length of 3, similarly to the shortened PUCCH format, as shown in FIG. 12. Terminal 200 maps the spread ACK/NACK signal to seven SC-FDMA symbols excluding the first SC-FDMA symbol for retuning time and DMRS's (six symbols). At this time, terminal 200 performs mapping of the ACK/NACK signal which has been spread, in the retuning subframe of the latter half, the mapping being performed similarly among terminals. Thereby, base station 100 can separate a plurality of response signals which have been code-multiplexed by orthogonal cover code sequences (Walsh sequences and DFT sequences) in retuning subframes in latter halves.

Next, methods for mapping a spread ACK/NACK signal in a retuning subframe of a latter half will be described.

Figure 13:
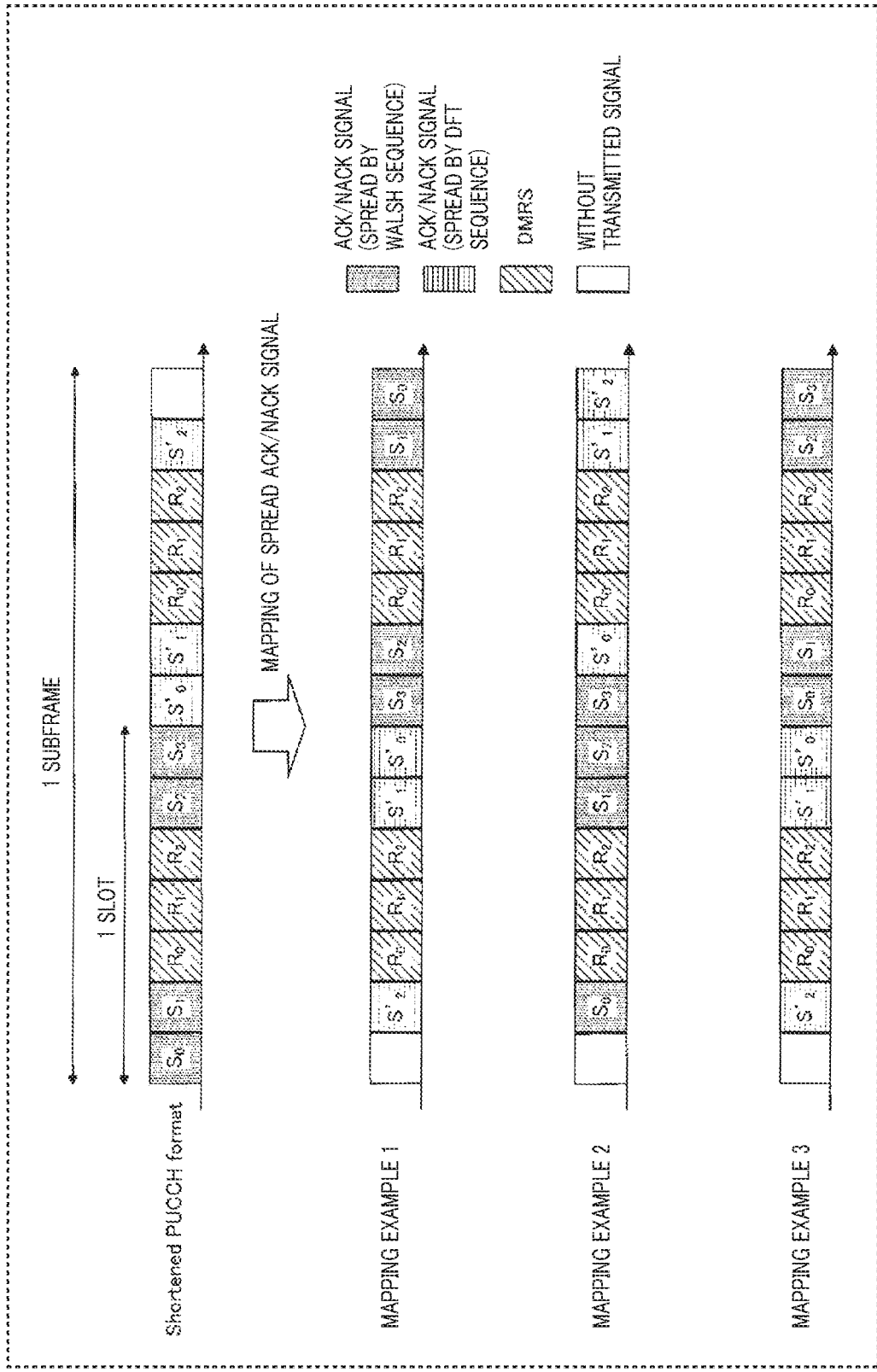
FIG. 13 illustrates an example of mapping of an ACK/NACK signal according to Embodiment 2.

FIG. 13 shows Mapping Examples 1 to 3 for an ACK/NACK signal.

In Mapping Example 1, terminal 200 changes (reverses) order of portions of an ACK/NACK signal which has been spread with the shortened PUCCH format and maps the ACK/NACK signal portions to seven SC-FDMA symbols excluding the first SC-FDMA symbol and DMRS's.

In Mapping Example 2, terminal 200 keeps the order of the portions of the ACK/NACK signal which has been spread with the shortened PUCCH format as it is and maps the ACK/NACK signal portions to seven SC-FDMA symbols excluding the first SC-FDMA symbol and DMRS's. In other words, in comparison with the mapping with the shortened PUCCH format, the symbols of the spread ACK/NACK signal are shifted by one symbol.

In Mapping Example 3, terminal 200 exchanges a former-half slot and a latter-half slot of the ACK/NACK signal which has been spread with the shortened PUCCH format, with each other and, after that, changes (reverses) order of the portions ($S'_0$, $S'_1$, $S'_2$) of the ACK/NACK signal which has been spread in the former-half slot and maps the portions to three SC-FDMA symbols excluding the first SC-FDMA symbol and DMRS's.

Methods for mapping an ACK/NACK signals which has been spread, in a retuning subframe of a latter half have been described above. The method for mapping an ACK/NACK signal which has been spread, in a retuning subframe of a latter half is not limited to Mapping Examples 1 to 3 described above. It is only necessary that the method is the same among terminals 200 in which mapping of an ACK/NACK signal in a retuning subframe of a latter half is code-multiplexed.

Thus, in the present embodiment, since a symbol which is not used for mapping of an ACK/NACK signal and DMRS's in the shortened PUCCH format is used for retuning time in a retuning subframe of a former half, collapse of orthogonality between orthogonal cover code sequences does not occur. Further, in a retuning subframe of a latter half, since the ACK/NACK signal is spread similarly to the shortened PUCCH format and mapped to symbols other than the first SC-FDMA data symbol and DMRS's, collapse of orthogonality between orthogonal cover code sequences does not occur. Therefore, collapse of orthogonality between orthogonal cover code sequences does not occur in each retuning subframe.

Further, in the present embodiment, since use of orthogonal cover code sequences (OCC sequences) is not restricted, the maximum number of terminals which can be multiplexed by an orthogonal cover code sequence can be kept at three (that is, c=3 in equation 2), which is the same as the number in the case of existing LTE terminals.

Embodiment 3

Since basic configurations of a base station and a terminal according to the present embodiment are the same as those of base station 100 and terminal 200 according to Embodiment 1, the base station and the terminal will be described with reference to FIGS. 9 and 10 again.

In the present embodiment, Method 3 (FIG. 6), among Methods 1 to 4 for securing retuning time described above, will be used. In other words, in the case of switching a narrowband to be used by frequency hopping, terminal 200 (control section 209) discards (punctures) the last SC-FDMA data symbol of one subframe immediately before retuning and the first SC-FDMA data symbol of one subframe immediately after retuning to use the SC-FDMA data symbols for retuning time.

The present embodiment is different from Embodiment 2 only in processing for an ACK/NACK signal in one subframe immediately after retuning (a retuning subframe of a latter half). Therefore, description of operation before PUSCH or PUCCH transmission/reception and operation at the time of PUSCH repetition will be omitted here.

In the present embodiment, at the time of PUCCH repetition, terminal 200 spreads and maps an ACK/NACK signal in a retuning subframe of a former half (one subframe immediately before retuning) with a shortened PUCCH format specified in Rel-12 and, after that, punctures the last SC-FDMA symbol for retuning time.

On the other hand, terminal 200 spreads the ACK/NACK signal in a retuning subframe of a latter half (one subframe immediately after retuning) with the shortened PUCCH format specified in Rel-12 and, after that, punctures the last SC-FDMA symbol. Further, in the present embodiment, terminal 200 adds a timing offset corresponding to one symbol to a transmission timing of a retuning subframe of a latter half.

Figure 14:
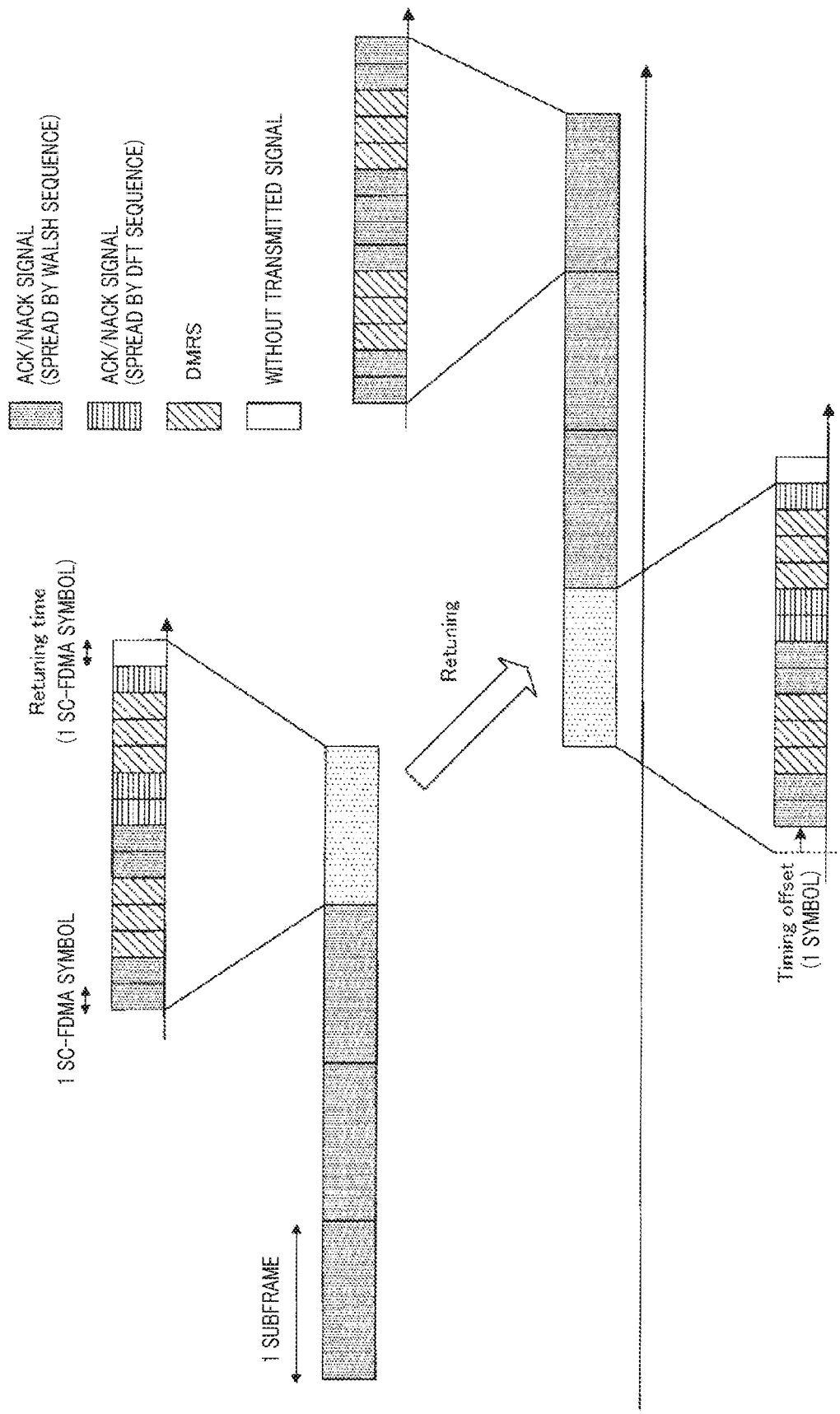
FIG. 14 illustrates an example of frequency hopping according to Embodiment 3.

FIG. 14 shows a state of frequency hopping in PUCCH repetition in the case of Method 3 and Y=4. As shown in FIG. 14, upon transmission of a repetition signal in consecutive subframes of Y=4, terminal 200 changes a frequency band by frequency hopping and transmits a repetition signal again in consecutive four subframes. At this time, terminal 200 punctures the last SC-FDMA symbol of one subframe immediately before retuning and the first SC-FDMA data symbol of one subframe immediately after retuning.

Further, as shown in FIG. 14, in a retuning subframe of a former half, an ACK/NACK signal is mapped with the shortened PUCCH format similarly to Embodiment 2. Therefore, as shown in FIG. 14, in the retuning subframe of the former half, the last SC-FDMA symbol to which the signal is not mapped in the shortened PUCCH format can be secured for retuning time.

On the other hand, in a retuning subframe of a latter half, the ACK/NACK signal is spread with a Walsh sequence with a sequence length of 4 and a DFT sequence with a sequence length of 3, similarly to the shortened PUCCH format, as shown in FIG. 14. Further, terminal 200 adds a timing offset corresponding to one SC-FDMA symbol to a transmission timing of the retuning subframe of the latter half. As a result, in the retuning subframe of the latter half, the signal in the shortened PUCCH format is transmitted from the second symbol as shown in FIG. 14. Thereby, the first SC-FDMA symbol of the retuning subframe of the latter half can be secured for retuning time. Further, since the shortened PUCCH format is applied as it is, in the retuning subframe of the latter half which is shown in FIG. 14, it is not necessary to specify a new PUCCH format, and it is also not necessary to change an ACK/NACK signal mapping method.

Thus, in the present embodiment, since a symbol which is not used for mapping of an ACK/NACK signal and DMRS's in the shortened PUCCH format is used for retuning time in a retuning subframe of a former half, collapse of orthogonality between orthogonal cover code sequences does not occur. Further, in a retuning subframe of a latter half, since the ACK/NACK signal is spread similarly to the shortened PUCCH format, and the signal is transmitted, with a timing offset corresponding to one SC-FDMA symbol added to the signal. Thereby, even if a symbol for retuning is secured, a signal in the shortened PUCCH format is kept as it is, and, therefore, collapse of orthogonality between orthogonal cover code sequences does not occur. Therefore, collapse of orthogonality between orthogonal cover code sequences does not occur in each retuning subframe.

Further, in the present embodiment, since use of orthogonal cover code sequences (OCC sequences) is not restricted, the maximum number of terminals which can be multiplexed by an orthogonal cover code sequence can be kept at three (that is, c=3 in equation 2), which is the same as the number in the case of existing LTE terminals.

Modifications of Embodiment 2 or 3

In Embodiments 2 and 3, description has been made on a case where the shortened PUCCH format or the shortened PUCCH format in which mapping is partially changed is used as a format for transmitting an ACK/NACK signal in a retuning subframe. In comparison, in the present modification, in the case where frequency hopping is applied to uplink transmission, terminal 200 performs PUCCH repetition transmission using the shortened PUCCH format or the shortened PUCCH format in which mapping is partially changed not only for a retuning subframe but also for all subframes to which repetition is applied.

Figure 15:
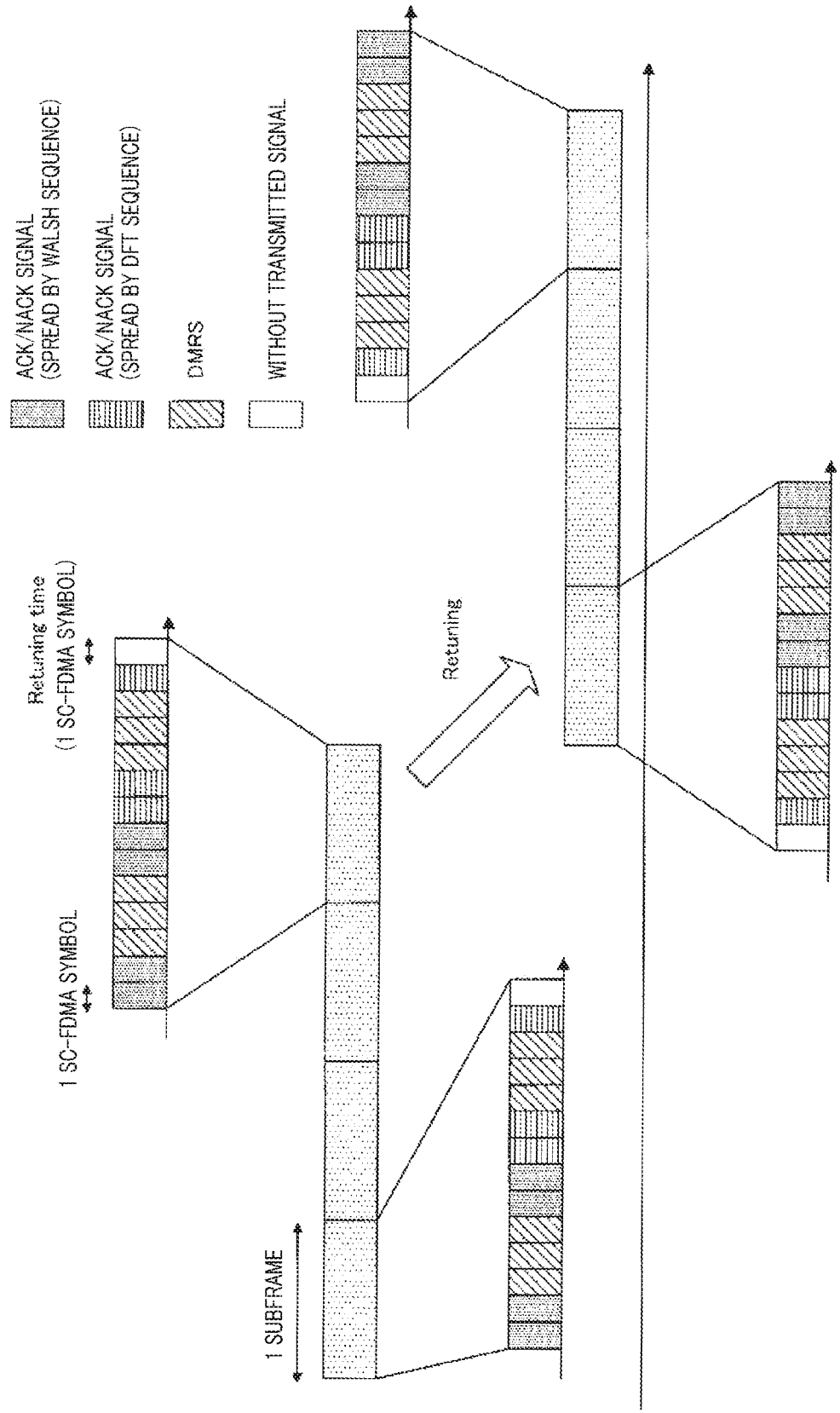
FIG. 15 illustrates an example of frequency hopping according to a modification of Embodiment 2 or 3.

FIG. 15 shows a state of frequency hopping in PUCCH repetition in the case of Y=4.

As shown in FIG. 15, upon transmission of a repetition signal in consecutive subframes of Y=4, terminal 200 changes a frequency band by frequency hopping and transmits a repetition signal again in consecutive four subframes. At this time, the shortened PUCCH format is used for all four subframes before retuning, and the shortened PUCCH format in which mapping is partially changed is used for all four subframes after retuning.

Thereby, ACK/NACK signals are multiplied by the same OCC sequence in the retuning subframe and the other subframes, and, therefore, base station 100 can perform channel estimation and symbol level combination for a plurality of subframes in units of Y subframes. In other words, it can be prevented that an ACK/NACK signal is multiplied by different OCC sequences in the retuning subframe and in the other subframes (specifically, a DFT sequence in the retuning subframe and a Walsh sequence in the other subframes), and, thereby, coherent combining of signal portions before being despread cannot be performed on base station 100 side, so that a demodulation process is complicated.

Embodiment 4

If a terminal transmits a PUCCH and a PUSCH in consecutive subframes, and a 1.4-MHz frequency band (narrowband) for PUCCH transmission and a 1.4-MHz frequency band (narrowband) for PUSCH transmission are different, retuning is required between PUCCH transmission and PUSCH transmission.

In Embodiments 1 to 3, description has been made on retuning in frequency hopping in the case of performing repetition transmission of a PUSCH or a PUCCH. In comparison, in the present embodiment, description will be made on retuning in PUCCH transmission after PUSCH transmission or in PUSCH transmission after PUCCH transmission.

Since basic configurations of a base station and a terminal according to the present embodiment are the same as those of base station 100 and terminal 200 according to Embodiment 1, the base station and the terminal will be described with reference to FIGS. 9 and 10 again.

In the present embodiment, Method 1 (FIG. 4) and Method 2 (FIG. 5) among Methods 1 to 4 for securing retuning time described above will be used. In other words, in the case of switching a narrowband to be used by frequency hopping, terminal 200 may discard the last two SC-FDMA data symbols of one subframe immediately before retuning to use the SC-FDMA data symbols for retuning time or may discard the first two SC-FDMA data symbols of one subframe immediately after retuning to use the SC-FDMA data symbols for retuning time.

In the present embodiment, if PUSCH transmission and PUCCH transmission are performed in consecutive subframes, retuning for changing the 1.4-MHz frequency band for transmission of terminal 200 can be secured without causing collapse of orthogonality between orthogonal cover code sequences to occur, by setting a retuning subframe similarly to Embodiment 1 (for example, FIG. 11).

In the present embodiment, base station 100 notifies terminal 200 of the number of PUSCH repetitions ($N_{PUSCH}$) or the number of PUCCH repetitions ($N_{PUCCH}$) in advance before PUSCH or PUCCH transmission/reception. The number of repetitions $N_{PUSCH}$ or $N_{PUCCH}$ may be indicated to terminal 200 from base station 100 via a UE-specific higher layer or may be indicated using a PDCCH for MTC.

Terminal 200 performs PUSCH or PUCCH repetition transmission the number of times corresponding to the number of repetitions indicated from base station 100 ($N_{PUSCH}$ or $N_{PUCCH}$).

Figure 16:
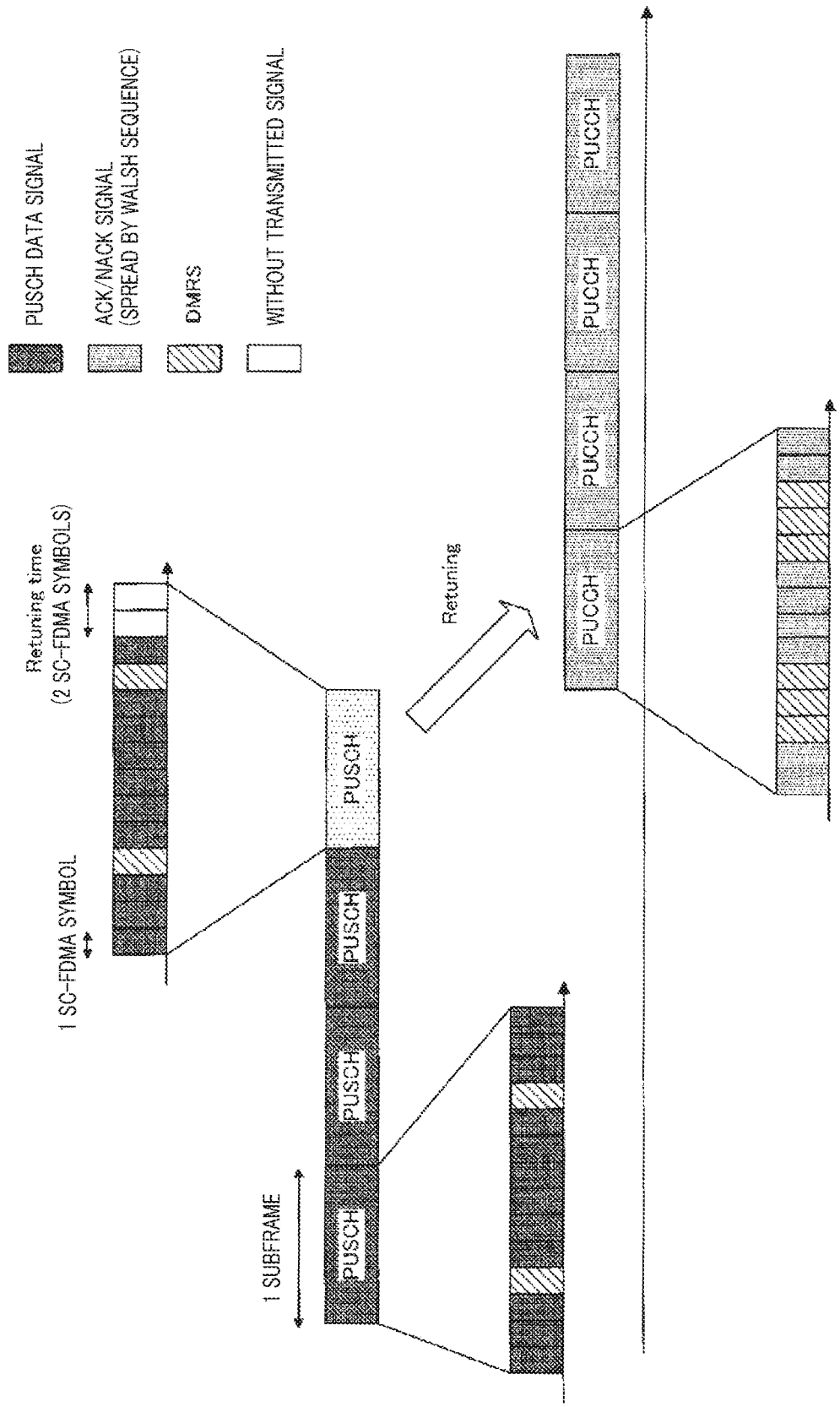
FIG. 16 illustrates an example of frequency hopping according to Embodiment 4.

Further, in a case where PUCCH repetition transmission is to be performed from a subframe next to a subframe for which PUSCH repetition transmission has ended, and the 1.4-MHz frequency band for PUSCH transmission and the 1.4-MHz frequency band for PUCCH transmission are different, terminal 200 punctures the last two SC-FDMA symbols of a PUSCH subframe immediately before retuning according to Method 1 (see FIG. 4) to secure the SC-FDMA symbols for retuning time as shown in FIG. 16.

Figure 17:
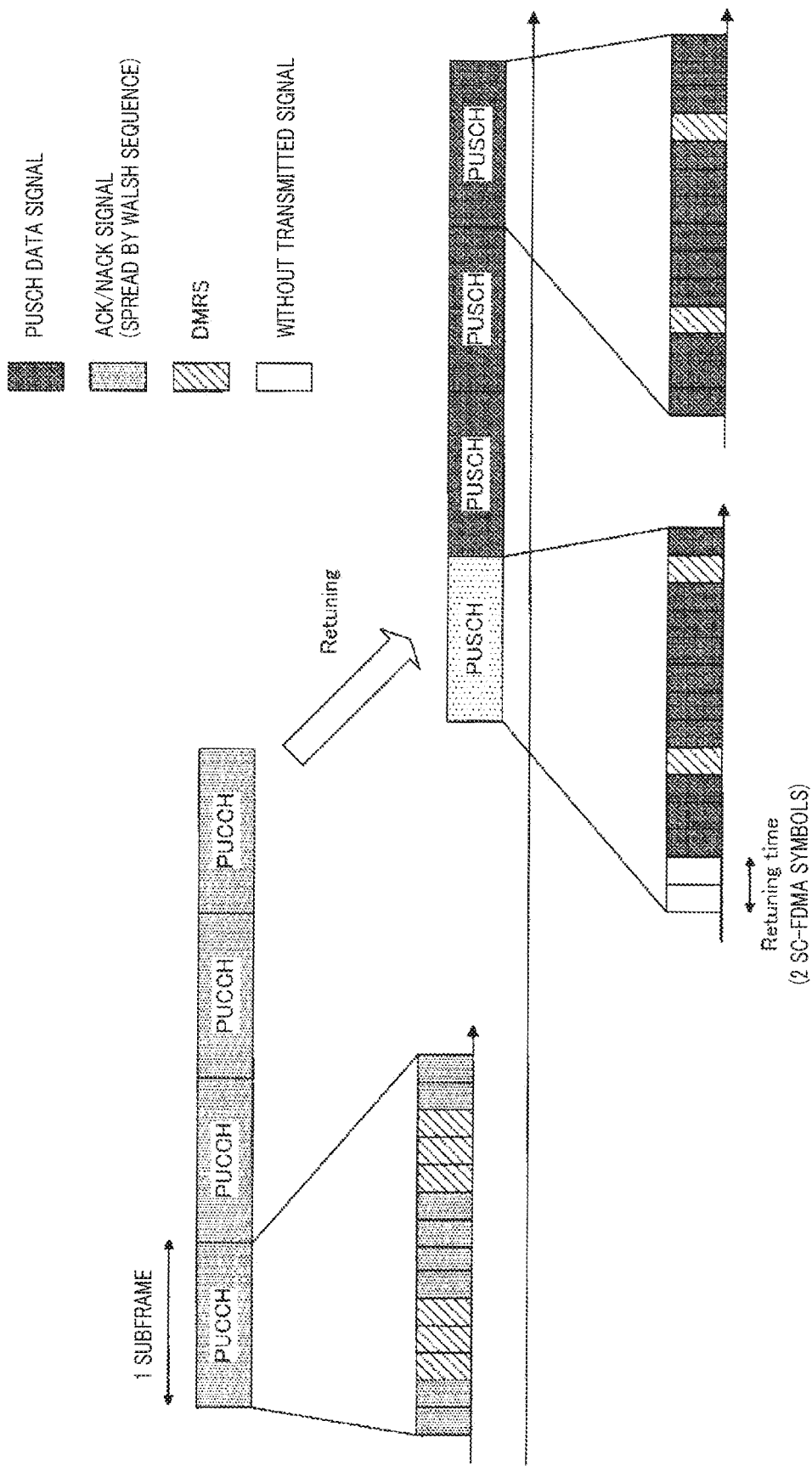
FIG. 17 illustrates an example of frequency hopping according to Embodiment 4.

On the other hand, in a case where PUCCH repetition transmission is to be performed from a subframe next to a subframe for which PUCCH repetition transmission has ended, and the 1.4-MHz frequency band for PUSCH transmission and the 1.4-MHz frequency band for PUCCH transmission are different, terminal 200 punctures the first two SC-FDMA symbols of a PUSCH subframe immediately after retuning according to Method 2 (see FIG. 5) to secure the SC-FDMA symbols for retuning time as shown in FIG. 17.

That is, if retuning is required immediately before PUCCH repetition transmission, terminal 200 discards the last two SC-FDMA symbols of one subframe immediately before PUCCH repetition is started to secure the SC-FDMA symbols for retuning time. Further, if retuning is required immediately after PUCCH repetition transmission, terminal 200 discards the first two SC-FDMA symbols of one subframe immediately after PUCCH repetition ends to secure the SC-FDMA symbols for retuning time.

In other words, in the case where PUSCH repetition transmission and PUCCH repetition transmission are performed in consecutive subframes, and the 1.4-MHz frequency band is different between PUSCH transmission and PUCCH transmission, terminal 200 punctures two SC-FDMA symbols immediately before (FIG. 16) or immediately after (FIG. 17) the 1.4-MHz frequency band (narrowband) in a subframe in which a PUSCH is transmitted is switched to secure retuning time.

Thus, by setting a retuning subframe on the PUSCH side when PUSCH transmission and PUCCH transmission are consecutively performed, the following problem can be solved.

First, description will be made on retuning from PUSCH transmission to PUCCH transmission shown in FIG. 16.

At the time of retuning, base station 100 has already transmitted an uplink grant indicating PUSCH assignment, to terminal 200 via a downlink control channel for MTC before a PUSCH is transmitted/received.

If the uplink grant can be correctly decoded, terminal 200 can transmit the PUSCH. In this case, if PUCCH transmission is performed in a subsequent subframe after the PUSCH transmission, terminal 200 performs retuning and then starts the PUCCH transmission. Therefore, retuning time is required between the PUSCH transmission and the PUCCH transmission.

On the other hand, if the uplink grant cannot be correctly decoded, terminal 200 does not transmit the PUSCH. In this case, since PUSCH transmission immediately before PUCCH transmission is not performed, terminal 200 does not have to perform retuning immediately before the PUCCH transmission. In such a case, if a retuning subframe is set on the PUCCH side, base station 100 assumes that a first subframe of PUCCH repetition is a retuning subframe, while terminal 200 actually sets the first subframe of the PUCCH repetition similarly to an ordinary subframe to transmit an ACK/NACK signal. Therefore, in the first subframe of the PUCCH repetition, a mismatch occurs between a PUCCH which base station 100 assumes and a PUCCH which terminal 200 actually transmits.

In comparison, in the present embodiment, in the case where PUCCH transmission is performed in a subsequent subframe after PUSCH transmission, a retuning subframe is set only on the PUSCH side. Thereby, it is possible to always use the first subframe of PUCCH repetition as an ordinary subframe without depending on whether decoding of an uplink grant is successful or not. Therefore, a mismatch related to a PUCCH does not occur between base station 100 and terminal 200. Further, since a retuning subframe is set only on the PUSCH side, it does not happen that setting of retuning time influences on orthogonality of OCC sequences in a PUCCH.

Next, description will be made on retuning from PUCCH transmission to PUSCH transmission shown in FIG. 17.

Retuning from PUCCH transmission to PUSCH transmission can be thought similarly to retuning from PUSCH transmission to PUCCH transmission. In other words, base station 100 has transmitted an uplink grant indicating PUSCH assignment, to terminal 200 via a downlink control channel for MTC before a PUSCH is transmitted/received.

If the uplink grant can be correctly decoded, terminal 200 can transmit the PUSCH. In this case, if PUSCH transmission is performed in a subsequent subframe after the PUCCH transmission, terminal 200 performs retuning and then starts the PUSCH transmission. Therefore, retuning time is required between the PUCCH transmission and the PUSCH transmission.

On the other hand, if the uplink grant cannot be correctly decoded, terminal 200 does not transmit the PUSCH. In this case, since PUSCH transmission immediately after PUCCH transmission is not performed, terminal 200 does not have to perform retuning immediately after the PUCCH transmission. In such a case, if a retuning subframe is set on the PUCCH side, base station 100 assumes that a last subframe of PUCCH repetition is a retuning subframe, while terminal 200 actually sets the last subframe of PUCCH repetition similarly to an ordinary subframe to transmit an ACK/NACK signal. Therefore, in the last subframe of PUCCH repetition, a mismatch occurs between a PUCCH which base station 100 assumes and a PUCCH which terminal 200 actually transmits.

In comparison, in the present embodiment, in the case where PUSCH transmission is performed in a subsequent subframe after PUCCH transmission, a retuning subframe is set only on the PUSCH side. Thereby, it is possible to always use the last subframe of PUCCH repetition as an ordinary subframe without depending on whether decoding of an uplink grant is successful or not. Therefore, a mismatch related to a PUCCH does not occur between base station 100 and terminal 200. Further, since a retuning subframe is set only on the PUSCH side, it does not happen that setting of retuning time influences orthogonality of an OCC of a PUCCH.

Embodiment 5

Since basic configurations of a base station and a terminal according to the present embodiment are the same as those of base station 100 and terminal 200 according to Embodiment 1, the base station and the terminal will be described with reference to FIGS. 9 and 10 again.

In a method for securing retuning time based on any of Methods 1 to 3 described in Embodiments 1 to 4, resource use efficiency in terminal 200 can be improved in comparison with Method 4 in which a guard subframe (one subframe) is provided for retuning. When a frequency hopping period is Y subframes, the resource use efficiency in Method 4 is $(Y-1)/Y$. On the other hand, the resource use efficiency in Methods 1 to 3 is $(Y-1+(12/14))/Y$. For example, in the case of Y=4, the resource use efficiency can be improved by 28% according to Methods 1 to 3 in comparison with Method 4.

On the other hand, in the case of a PUCCH, it is possible to cause a plurality of terminals 200 to be multiplexed within the same time/frequency resources by an OCC (Orthogonal Cover Code) sequence. Therefore, in addition to the resource use efficiency in terminals 200, resource use efficiency in a network is also an important indicator.

The PUCCH resource use efficiency in a network is obtained by multiplying the resource use efficiency in terminal 200 by the number of terminals which can be multiplexed by an orthogonal cover code sequence (for example, c in equation 2). In other words, the PUCCH resource use efficiency in a network is $2\times(Y-1+(12/14))/Y$ in Embodiments 1 and 4 (Method 1 or 2; c=2) and $3\times(Y-1+(12/14))/Y$ in Embodiments 2 and 3 (Method 3; c=3). On the other hand, the PUCCH resource use efficiency in a network in Method 4, that is, in the case of providing a guard subframe (one subframe) for retuning is $3\times(Y-1)/Y$.

From the above, it can be said that the PUCCH resource use efficiency in a network is the largest in Embodiments 2 and 3. On the other hand, in Embodiment 1 or 4, the number of terminals which can be multiplexed by an OCC is not three but restricted to two, and, therefore, the PUCCH resource use efficiency in a network decreases.

Specifically, the PUCCH resource use efficiency in a network in the method of Embodiment 1 is $2\times(Y-1+(12/14))/Y$, and the PUCCH resource use efficiency in a network in Method 4 (a method in which a guard subframe is provided for retuning) is $3\times(Y-1)/Y$ as described above. Therefore, when both resource use efficiencies are compared, the PUCCH resource use efficiency in a network in Method 4 is larger than that in the method of Embodiment 1 in the case of Y>2.72, that is, when the frequency hopping period Y is 3 or larger.

Therefore, in the present embodiment, description will be made on a case where the method of Embodiment 1 and Method 4 (a method in which a guard subframe is provided for retuning) are used together in consideration of the PUCCH resource use efficiency in a network. Specifically, terminal 200 switches between the method of Embodiment 1 and Method 4 (a method in which a guard subframe is provided for retuning) according to a frequency hopping period.

Figure 18:
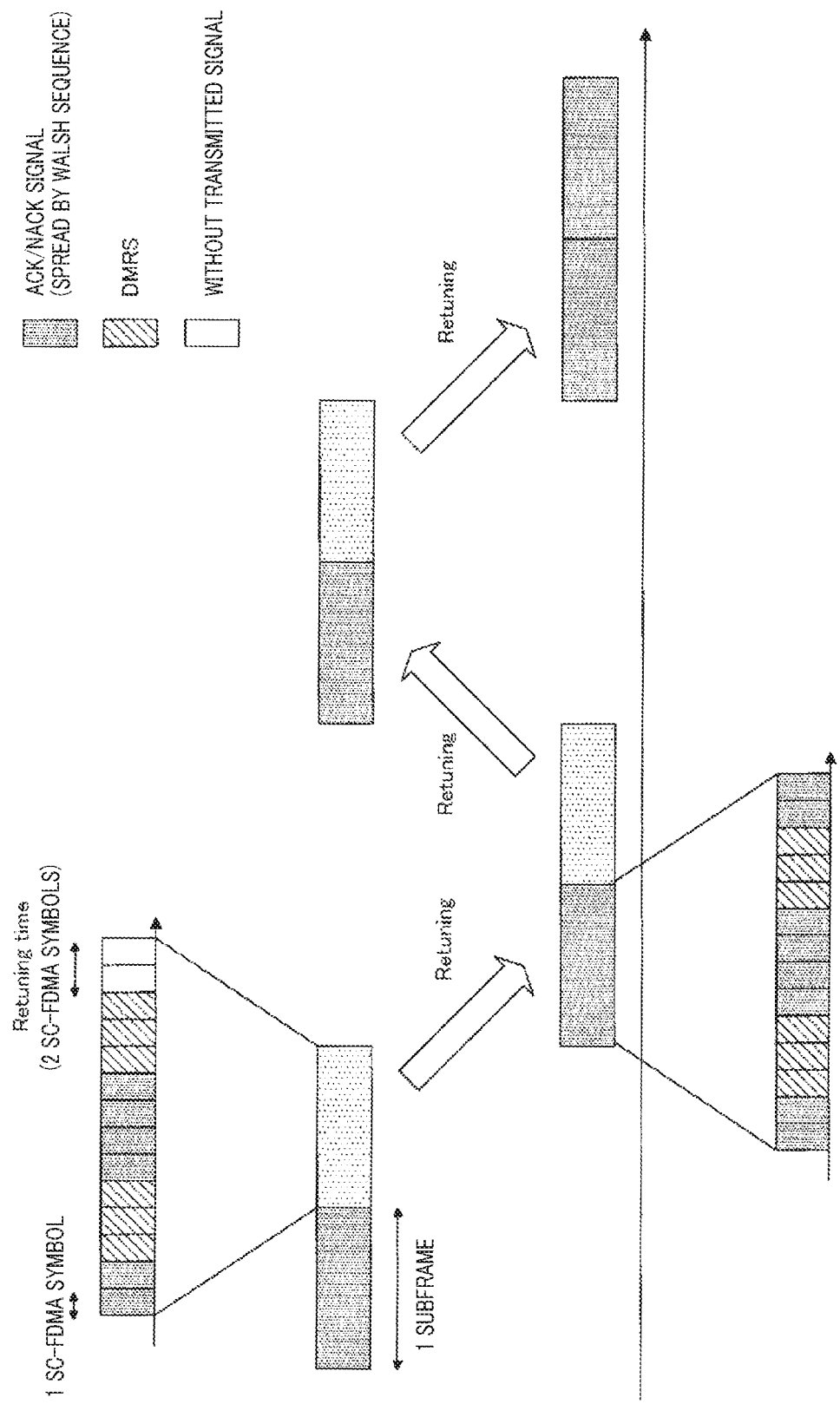
FIG. 18 illustrates an example of frequency hopping according to Embodiment 5.
Figure 19:
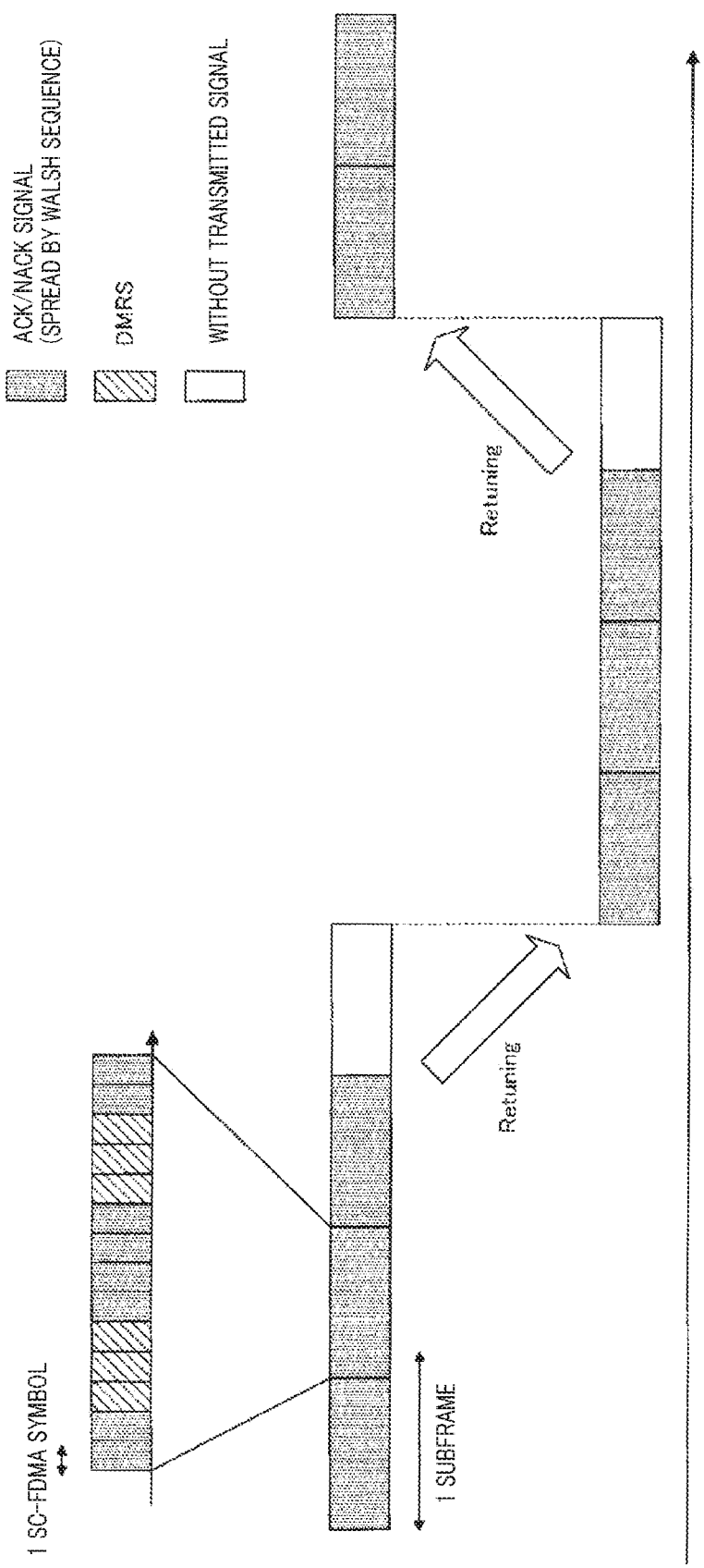
FIG. 19 illustrates an example of frequency hopping according to Embodiment 5.

FIG. 18 shows a state of frequency hopping in PUCCH repetition in the case of Y=2 (<3), and FIG. 19 shows a state of frequency hopping in PUCCH repetition in the case of Y=4 (≥3).

As shown in FIG. 18, if the frequency hopping period is below 3, terminal 200 uses the method of Embodiment 1, that is, punctures the last two SC-FDMA symbols of a subframe immediately before retuning to secure retuning time. On the other hand, as shown in FIG. 19, if the frequency hopping period is 3 or more, terminal 200 does not puncture the two SC-FDMA symbols described above but uses Method 4, that is, provides a guard subframe between subframes before and after retuning to secure retuning time.

Thus, by switching between methods for securing retuning time according to a frequency hopping period, terminal 200 can optimize the PUCCH resource use efficiency in a network. Further, in Method 4, since the whole of the retuning subframe is discarded, collapse of orthogonality of a PUCCH is not caused.

Which method (the method of Embodiment 1 or Method 4) is to be used is not limited to the case where terminal 200 decides which method is to be used based on a frequency hopping period. For example, base station 100 may indicate terminal 200 about which method (the method of Embodiment 1 or Method 4) is to be used via a cell-specific higher layer or a UE-specific higher layer.

Further, operation of terminal 200 deciding which method (the method of Embodiment 1 or Method 4) is to be used may be operation predefined according to standards. For example, if terminal 200 is in a coverage enhancement mode A (no/small repetition) (that is, the number of subframes to be repeated is small), it is assumed that a frequency hopping period is short, and, therefore, the method of Embodiment 1 is used. If terminal 200 is in a coverage enhancement mode B (large repetition) (that is, the number of subframes to be repeated is large), it is assumed that a frequency hopping frequency is long, and, therefore, it is also possible to use Method 4.

Further, a threshold $Y_{th}$ for switching a method for securing retuning time may be set as a parameter. Here, $Y_{th}$ may be notified to terminal 200 by base station 100 via a cell-specific higher layer as a cell-specific parameter or indicated to terminal 200 by base station 100 via a UE-specific higher layer as a UE-specific parameter. Further, $Y_{th}$ may be a parameter predefined according to standards.

Embodiment 6

Figure 20:
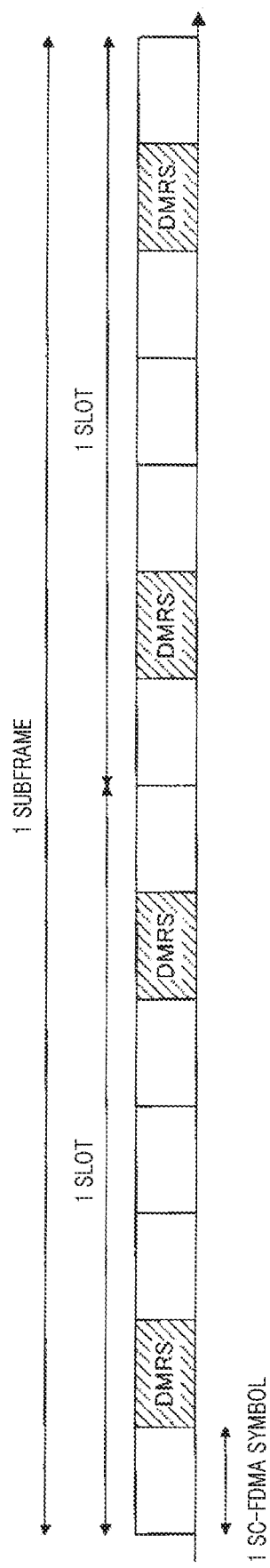
FIG. 20 illustrates an example of a configuration of a PUCCH format 2/2a/2b subframe.

In a PUCCH, not only transmission of an ACK/NACK signal but also transmission of CSI feedback, which is periodically transmitted on an uplink, is performed. In the case of transmissions of the CSI feedback, or when transmission of the CSI feedback and transmission of an ACK/NACK signal overlap, a PUCCH format 2/2a/2b is used. FIG. 20 shows a configuration example of a PUCCH format 2/2a/2b subframe. As shown in FIG. 20, two DMRS's and five SC-FDMA data symbols (CSI feedback information) are time-multiplexed in each slot.

Therefore, in the present embodiment, operation of retuning for the PUCCH format 2/2a/2b will be described.

Repetition transmission of the PUCCH format 2/2a/2b is not assumed. Operation in a case where repetition transmission using the PUCCH format 1/1a/1b or PUSCH repetition transmission, and transmission using the PUCCH format 2/2a/2b occur in consecutive subframes will be described below as an example.

If the last two SC-FDMA symbols of one subframe immediately before retuning or at the first two SC-FDMA symbols of one subframe immediately after retuning are punctured as in Method 1 (FIG. 4) or Method 2 (FIG. 5) when a subframe using the PUCCH format 2/2a/2b is a retuning subframe, DMRS's are punctured. In this case, base station 100 cannot use the DMRS's, and, therefore, demodulation becomes difficult.

Therefore, in the present embodiment, if retuning is required before and after transmission using the PUCCH format 2/2a/2b, terminal 200 drops one subframe of any one of the channels before and after retuning.

Which of the channels before and after retuning is to be prioritized (or to be dropped) depends on norms of priority.

For example, in the current standards, priority order is generally ACK/NACK signal>PUSCH>periodical CSI. In this case, the PUCCH format 2/2a/2b immediately before or immediately after retuning is dropped because its priority is low.

By dropping any one of the channels according to priority as described above, it is possible to prevent influence on a higher-priority channel in retuning. For example, if priority of ACK/NACK signal is increased, it is possible to prevent influence of dropping on the PUCCH format 1/1a/1b, and, therefore, collapse of orthogonality of a PUCCH is not caused. Even if priority of ACK/NACK signal is decreased on the contrary, the whole subframe of the ACK/NACK signal is discarded, and, therefore, orthogonality of a PUCCH is not influenced.

In the case where retuning is required before and after transmission using the PUCCH format 2/2a/2b, Method 3 (FIG. 6) may be applied. In other words, terminal 200 may puncture the last symbol of one subframe immediately before retuning and the first symbol of one subframe immediately after retuning. In this case, even if a subframe using the PUCCH format 2/2a/2b becomes a retuning subframe, DMRS's are not punctured. Therefore, puncture does not influence demodulation in base station 100.

Each embodiment of the present disclosure has been described above.

Though, in the above embodiments, description has been made on a case where an aspect of the present disclosure is implemented by hardware, the present disclosure can be realized by software in cooperation with hardware.

Further, each functional block used in the description of the above embodiments is typically realized as an LSI which is an integrated circuit. The integrated circuit controls each functional block used in the description of the above embodiments and may be provided with an input and an output. These may be individually integrated into one chip, or a part or all of them may be into one chip so that the part or all of them are included. Though the integrated circuit is assumed to be an LSI here, it may also be referred to as an IC, system LSI, super LSI or ultra LSI according to difference in a degree of integration.

Further, a scheme for integrated circuitization is not limited to an LSI, but the integrated circuit may be realized by a dedicated circuit or a general-purpose processor. An FPGA (Field Programmable Gate Array) which can be programmed after manufacture of an LSI or a reconfigurable processor in which connections and settings of circuit cells inside the LSI can be reconfigured may be used.

Furthermore, if an integrated circuitization technology which replaces the LSI appears due to progress in semiconductor technology or other derived technologies, integration of the functional blocks may be, of course, performed using the technology. Application of biotechnology and the like can be possibilities.

A terminal of the present disclosure is provided with: a control section that, if, for a narrowband to be used for a subframe to transmit uplink data, switching from a first narrowband used for a first subframe to a second narrowband different from the first narrowband, for a second subframe following the first subframe, punctures a last one symbol of the first subframe and a first one symbol of the second subframe to set the symbols as retuning time; and a transmitting section that transmits the uplink data in the first narrowband and the second narrowband.

A terminal of the present disclosure is provided with: a control section that, if switching from a first narrowband used for a first subframe to transmit ACK/NACK to downlink data to a second narrowband different from the first narrowband, for a second subframe to transmit uplink data, the second subframe following the first subframe, sets first two symbols of the second subframe as retuning time; and a transmitting section that transmits the ACK/NACK in the first narrowband and transmits the uplink data in the second narrowband.

A terminal of the present disclosure is provided with: a control section that, if switching from a first narrowband used for a first subframe to transmit uplink data to a second narrowband different from the first narrowband, for a second subframe to transmit ACK/NACK to downlink data, the second subframe following the first subframe, sets last two symbols of the first subframe as retuning time; and a transmitting section that transmits the uplink data in the first narrowband and transmits the ACK/NACK in the second narrowband.

A terminal of the present disclosure is provided with: a control section that, if, for a narrowband to be used for a subframe to transmit feedback of CSI (Channel State Information) using a PUCCH (Physical Uplink Control Channel) format 2a/2b, switching from a first narrowband used for a first subframe to a second narrowband different from the first narrowband, for a second subframe following the first subframe, punctures a last one symbol of the first subframe and a first one symbol of the second subframe to set the symbols as retuning time; and a transmitting section that transmits the CSI signal in the first narrowband and the second narrowband.

In the terminal of the present disclosure, the control section switches from the first narrowband to the second narrowband by frequency hopping.

In the terminal of the present disclosure, the first narrowband and the second narrowband are set for MTC (Machine Type Communication) terminals.

A transmission method of the present disclosure includes: if, for a narrowband to be used for a subframe to transmit uplink data, a first narrowband used for a first subframe is switched to a second narrowband different from the first narrowband, for a second subframe following the first subframe, puncturing a last one symbol of the first subframe and a first one symbol of the second subframe to set the symbols as retuning time; and transmitting the uplink data in the first narrowband and the second narrowband.

A transmission method of the present disclosure includes: if a first narrowband used for a first subframe to transmit ACK/NACK to downlink data is switched to a second narrowband different from the first narrowband, for a second subframe to transmit uplink data, the second subframe following the first subframe, setting first two symbols of the second subframe as retuning time; and transmitting the ACK/NACK in the first narrowband and transmitting the uplink data in the second narrowband.

A transmission method of the present disclosure includes: if a first narrowband used for a first subframe to transmit uplink data is switched to a second narrowband different from the first narrowband, for a second subframe to transmit ACK/NACK to downlink data, the second subframe following the first subframe, setting last two symbols of the first subframe as retuning time; and transmitting the uplink data in the first narrowband and transmitting the ACK/NACK in the second narrowband.

A transmission method of the present disclosure includes: if, for a narrowband to be used for a subframe to transmit feedback of CSI using a PUCCH format 2a/2b, a first narrowband used for a first subframe is switched to a second narrowband different from the first narrowband, for a second subframe following the first subframe, puncturing a last one symbol of the first subframe and a first one symbol of the second subframe to set the symbols as retuning time; and transmitting the CSI signal in the first narrowband and the second narrowband.

INDUSTRIAL APPLICABILITY

An aspect of the present disclosure is useful for a mobile communication system.

REFERENCE SIGNS LIST

100 Base station
200 Terminal
101,209 Control section
102 Control signal generating section
103 Control signal encoding section
104 Control signal modulating section
105, 210 Data encoding section
106 Retransmission control section
107 Data modulating section
108, 217 Signal assigning section
109, 218 IFFT section
110, 219 CP adding section
111, 220 Transmitting section
112, 201 Antenna
113, 202 Receiving section
114, 203 CP removing section
115, 204 FFT section
116, 205 Extracting section
117 Demapping section
118 Channel estimating section
119 Equalizing section
120 Demodulating section
121 Decoding section
122, 125 Judging section
123 Despreading section
124 Correlation processing section
206 Data demodulating section
207 Data decoding section
208 CRC section
211 CSI signal generating section
212 Response signal generating section
213 Modulating section
214 DFT section
215 Spreading section
216 Repetition section

The invention claimed is:

1. An integrated circuit comprising:
circuitry, which, in operation, controls
setting a retuning time, when retuning from a first narrowband for transmitting a first channel in a first subframe to a second narrowband different from the first narrowband for transmitting a second channel in a second subframe, the second subframe being consecutive to the first subframe along a time axis; and
transmitting the first channel and the second channel;
wherein:
when the first channel and the second channel are a PUCCH (Physical Uplink Control Channel) for transmitting a channel state information (CSI), the circuitry sets the last symbol of the first subframe and the first symbol of the second subframe as the retuning time, the CSI being generated using a normal PUCCH format, and some of the CSI being punctured for the retuning time.

2. The integrated circuit according to claim 1, wherein, when the first channel is the PUCCH for transmitting an ACK/NACK (Acknowledgement/Negative Acknowledgement) signal and the second channel is a PUSCH (Physical Uplink Shared Channel) for transmitting uplink data, the circuitry sets first two symbols of the second subframe as the retuning time.

3. The integrated circuit according to claim 1, wherein, when the first channel is the PUSCH for transmitting uplink data and the second channel is the PUCCH for transmitting an ACK/NACK signal, the circuitry sets last two symbols of the first subframe as the retuning time.

4. The integrated circuit according to claim 1, wherein the circuitry retunes from the first narrowband to the second narrowband using frequency hopping.

5. The integrated circuit according to claim 1, wherein, when the first channel and the second channel are the PUCCH for transmitting the ACK/NACK signal, the circuitry sets a last symbol of the first subframe and a first symbol of the second subframe as the retuning time, the ACK/NACK signal being generated using a shortened PUCCH format for the retuning time.

6. The integrated circuit according to claim 1, wherein the first narrowband and the second narrowband are set for MTC (Machine Type Communication) terminals.

* * * * *